(12) United States Patent
Kato

(10) Patent No.: US 11,218,642 B2
(45) Date of Patent: Jan. 4, 2022

(54) APPEARANCE INSPECTION SYSTEM, SETTING DEVICE, AND INSPECTION METHOD

(71) Applicant: OMRON Corporation, Kyoto (JP)

(72) Inventor: Yutaka Kato, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/278,152

(22) Filed: Feb. 17, 2019

(65) Prior Publication Data

US 2019/0297266 A1 Sep. 26, 2019

(30) Foreign Application Priority Data

Mar. 22, 2018 (JP) .............................. JP2018-054593

(51) Int. Cl.
*G05B 19/416* (2006.01)
*H04N 5/232* (2006.01)
(Continued)

(52) U.S. Cl.
CPC ........ *H04N 5/23299* (2018.08); *B25J 9/1671* (2013.01); *B25J 11/00* (2013.01); *G01N 21/9515* (2013.01); *G05B 19/401* (2013.01); *G05B 19/416* (2013.01); *G01N 2021/887* (2013.01); *G01N 2021/8867* (2013.01); *G05B 2219/50362* (2013.01)

(58) Field of Classification Search
CPC ....................... H04N 5/23299; G01N 21/9515
See application file for complete search history.

(56) References Cited

U.S. PATENT DOCUMENTS 5,973,700 A * 10/1999 Taylor .................. H04N 13/282
345/427
2011/0298901 A1 12/2011 Derrien et al.
(Continued)

FOREIGN PATENT DOCUMENTS

CN 105793695 7/2016
JP 2000046533 2/2000
(Continued)

OTHER PUBLICATIONS

"Search Report of Europe Counterpart Application", dated Jul. 29, 2019, pp. 1-8.
(Continued)

*Primary Examiner* — Jerry T Jean Baptiste
(74) *Attorney, Agent, or Firm* — JCIPRNET

(57) ABSTRACT

The disclosure provides an appearance inspection system that can reduce subject blurring when an object is imaged while changing a relative position of an imaging device with respect to the object. A first control unit causes the imaging device to perform imaging when the imaging device reaches an imaging position corresponding to the inspection target position. A second control unit changes at least one of the position and the orientation of the imaging device in a direction in which a relative movement between a field of view of the imaging device and the inspection target position according to the change in the relative position along a designated path is canceled out during a predetermined period including a time point at which the imaging device reaches the imaging position.

18 Claims, 15 Drawing Sheets

(51) Int. Cl.
    *B25J 9/16*     (2006.01)
    *G05B 19/401*     (2006.01)
    *G01N 21/95*     (2006.01)
    *B25J 11/00*     (2006.01)
    *G01N 21/88*     (2006.01)

(56) References Cited

U.S. PATENT DOCUMENTS

| | | |
|---|---|---|
| 2013/0147939 A1 | 6/2013 | Nawata et al. |
| 2014/0184753 A1* | 7/2014 | Kawamoto .......... H04N 13/211 348/47 |
| 2016/0379357 A1* | 12/2016 | Takazawa .............. B25J 9/1697 348/86 |
| 2018/0124326 A1 | 5/2018 | Irie et al. |

FOREIGN PATENT DOCUMENTS

| | | |
|---|---|---|
| JP | 2004340643 | 12/2004 |
| JP | 2007248241 | 9/2007 |
| JP | 2009085785 | 4/2009 |
| JP | 2016533484 | 10/2016 |
| JP | 2017-015396 | 1/2017 |
| WO | 2017002512 | 1/2017 |

OTHER PUBLICATIONS

Office Action of Japan Counterpart Application, with English translation thereof, dated Feb. 24, 2021, pp. 1-8.
"Office Action of China Counterpart Application", dated Jun. 3, 2021, with English translation thereof, p. 1-p. 17.

* cited by examiner

APPEARANCE INSPECTION SYSTEM, SETTING DEVICE, AND INSPECTION METHOD

CROSS-REFERENCE TO RELATED APPLICATION

This application claims the priority of Japan patent application serial no. 2018-054593, filed on Mar. 22, 2018. The entirety of the above-mentioned patent application is hereby incorporated by reference herein and made a part of this specification.

BACKGROUND

Technical Field

The present technology relates to an appearance inspection system that allows inspection of an object using a captured image, a setting device used in the appearance inspection system, and an inspection method.

Description of Related Art

In Japanese Patent Application Laid-open No. 2017-15396 (Patent Document 1), an inspection method of imaging a workpiece while changing a relative position between a workpiece and an imaging device, and inspecting a workpiece using a captured image is disclosed.

In the above inspection device of the related art, since a relative position between a workpiece and an imaging device changes during imaging, subject blurring occurs and inspection accuracy decreases.

SUMMARY

According to an example of the present disclosure, an appearance inspection system images an inspection target position on an object using an imaging device and allows appearance inspection to be performed while changing a relative position of the imaging device with respect to the object along a designated path. The appearance inspection system includes a movement mechanism, a first control unit, and a second control unit. The movement mechanism changes the relative position. The first control unit causes the imaging device to perform imaging when the imaging device reaches an imaging position corresponding to the inspection target position. The second control unit changes at least one of a position and an orientation of the imaging device in a direction in which a relative movement between a field of view of the imaging device and the inspection target position according to the change in the relative position along the designated path is canceled out during a predetermined period including a time point at which the imaging device reaches the imaging position or while the imaging device is positioned in a predetermined space including the imaging position.

According to an example of the present disclosure, the setting device is used in the appearance inspection system and includes a setting unit. According to this disclosure, the second control unit changes at least one of the position and the orientation of the imaging device in the predetermined direction, and thus can reliably cancel out a relative movement between the imaging field of view and the inspection target position according to movement along the designated path.

According to an example of the present disclosure, in an inspection method, an inspection target position on an object is imaged using an imaging device and appearance inspection is performed while changing a relative position of the imaging device with respect to the object along a designated path. The inspection method includes a step of starting imaging by the imaging device when the imaging device reaches an imaging position corresponding to the inspection target position and a step of changing at least one of a position and an orientation of the imaging device in a direction in which a relative movement between a field of view of the imaging device and the inspection target position according to the change in the relative position along the designated path is canceled out during a predetermined period including a time point at which the imaging device reaches the imaging position or while the imaging device is positioned in a predetermined space including the imaging position.

DESCRIPTION OF THE EMBODIMENTS

Figure 1:
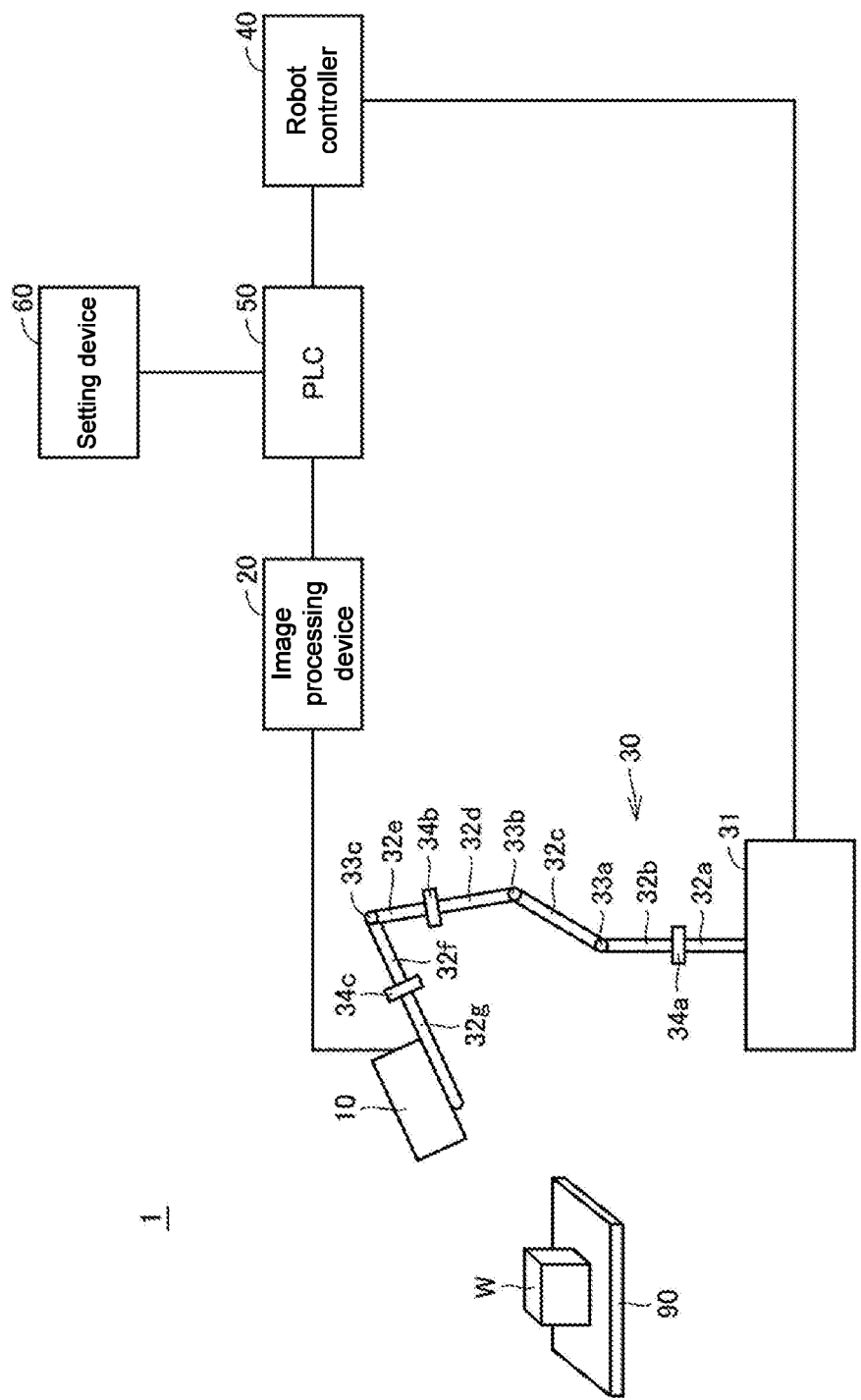
FIG. 1 is a schematic diagram showing an overview of an appearance inspection system according to the present embodiment.

The disclosure is directed to provide an appearance inspection system that can reduce subject blurring when an object is imaged while changing a relative position of an imaging device with respect to the object, a setting device used in the appearance inspection system, and an inspection method.

According to this disclosure, when the imaging device reaches the imaging position, a relative movement between the imaging field of view and the inspection target position is canceled out. As a result, even if the object is imaged while changing a relative position of the imaging device with respect to the object, it is possible to reduce subject blurring.

In the above disclosure, the movement mechanism includes a first movement mechanism that moves the imaging device. The second control unit controls the first movement mechanism such that at least one of the position and the orientation of the imaging device is changed in a direction in which a relative movement is canceled out.

According to this disclosure, it is possible to make the imaging device easily perform an operation in a direction in which a relative movement between a field of view of the imaging device and the inspection target position is canceled out.

In the above disclosure, the first movement mechanism moves the imaging device along the designated path. The second control unit changes the orientation of the imaging device so that an imaging direction of the imaging device approaches the inspection target position.

According to this disclosure, it is possible to cancel out a relative movement between a field of view of the imaging device and the inspection target position while moving the imaging device, and it is possible to reduce subject blurring.

In the above disclosure, the first movement mechanism includes a slide unit that slidably supports the imaging device and a robot that moves the slide unit. The robot moves the slide unit along the designated path. The second control unit controls the slide unit to slide the imaging device so that an imaging direction of the imaging device approaches the inspection target position.

According to this disclosure, it is possible to cancel out a relative movement between a field of view of the imaging device and the inspection target position while moving the slide unit, and it is possible to reduce subject blurring.

In the above disclosure, the movement mechanism further includes a second movement mechanism that moves the object so that the relative position changes along the designated path.

According to this disclosure, the first movement mechanism does not need to perform an operation for changing a relative position along the designated path. Therefore, a complex movement of the first movement mechanism can be prevented.

In the above disclosure, the second control unit changes at least one of the position and the orientation of the imaging device in a predetermined direction. The appearance inspection system further includes a setting unit that sets the designated path so that an angle formed by a movement direction of the relative position at the imaging position and the predetermined direction is less than 10 degrees.

According to this disclosure, the second control unit changes at least one of the position and the orientation of the imaging device in the predetermined direction, and thus can reliably cancel out a relative movement between the imaging field of view and the inspection target position according to movement along the designated path.

In the above disclosure, the predetermined direction is perpendicular to an optical axis of the imaging device. According to this disclosure, the setting unit can set a designated path in which a range less than 10 degrees from a direction orthogonal to the optical axis of the imaging device is set as a travelling direction. Generally, the surface of the object is perpendicular to the optical axis of an imaging device 10 in many cases. Therefore, it is easy to set a designated path along which a plurality of inspection target positions on the object are sequentially imaged.

According to this disclosure also, even if the object is imaged while changing a relative position of the imaging device with respect to the object, it is possible to reduce subject blurring.

According to the disclosure, it is possible to reduce subject blurring when the object is imaged while changing a relative position of the imaging device with respect to the object.

Embodiments of the disclosure will be described in detail with reference to the drawings. Here, the same or corresponding parts in the drawings will be denoted with the same reference numerals, and descriptions thereof will not be repeated.

§ 1 Application Example

First, an example of a case to which the disclosure is applied will be described with reference to FIG. 1. FIG. 1 is a schematic diagram showing an overview of an appearance inspection system according to the present embodiment.

An appearance inspection system 1 according to the present embodiment images a plurality of inspection target positions on a workpiece W placed on a stage 90, for example, in a production line of industrial products, and allows appearance inspection of the workpiece W to be performed using the obtained images. In the appearance inspection, scratches, contamination, presence or absence of foreign substances, the size, and the like of the workpiece W are inspected for.

When the appearance inspection of the workpiece W placed on the stage 90 is completed, a next workpiece W is transported onto the stage 90. In this case, the workpiece W is placed at a predetermined position with a predetermined orientation on the stage 90.

As shown in FIG. 1, the appearance inspection system 1 includes an imaging device 10, an image processing device 20, a robot 30, a robot controller 40, a programmable logic controller (PLC) 50, and a setting device 60.

The imaging device 10 captures a subject present in an imaging field of view and generates image data according to an imaging trigger (imaging instruction) from the image processing device 20, and captures the workpiece W which is an object of appearance inspection as a subject.

When the imaging device 10 reaches an imaging position at which an inspection target position on the workpiece W can be imaged, according to an instruction from the PLC 50, the image processing device 20 outputs an imaging trigger to the imaging device 10 and causes the imaging device 10 to perform imaging. The image processing device 20 acquires image data generated from the imaging device 10. The image processing device 20 performs a predetermined processing on the acquired image data and thus determines whether the appearance of the workpiece W is favorable.

The robot 30 is a first movement mechanism for moving the imaging device 10, and is, for example, a vertical articulated robot in which a plurality of arms 32a to 32g are connected on a base 31. The robot 30 includes joints 33a to 33c and rotation shafts 34a to 34c.

One end of the arm 32a is fixed to the base 31. One end of the arm 32b is connected to the other end of the arm 32a via the rotation shaft 34a. The arms 32a and 32b and the rotation shaft 34a are positioned coaxially. The arm 32b is rotatable with respect to the arm 32a. One end of the arm 32c is connected to the other end of the arm 32b via the joint 33a. The arm 32c and the arm 32b can be bent at the joint 33a. One end of the arm 32d is connected to the other end of the arm 32c via the joint 33b. The arm 32d and the arm 32c can be bent at the joint 33b. One end of the arm 32e is connected to the other end of the arm 32d via the rotation shaft 34b. The arms 32d and 32e, and the rotation shaft 34b are positioned coaxially. The arm 32e is rotatable with respect to the arm 32d. One end of the arm 32f is connected to the other end of the arm 32e via the joint 33c. The arm 32f and the arm 32e can be bent at the joint 33c. One end of the arm 32g is connected to the other end of the arm 32f via the rotation shaft 34c. The arms 32f and 32g, and the rotation shaft 34c are positioned coaxially. The arm 32g is rotatable with respect to the arm 32f. The imaging device 10 is attached to the other end of the arm 32g.

As described above, the workpiece W is placed at a predetermined position with a predetermined orientation on the stage 90. Therefore, the robot 30 changes a relative position and a relative orientation of the imaging device 10 with respect to the stage 90, and thus can change a relative position and a relative orientation of the imaging device 10 with respect to the workpiece W. That is, the robot 30 moves the imaging device 10 using a coordinate system in which a point on the stage 90 is set as the origin, and thus can change a relative position and a relative orientation of the imaging device 10 with respect to the workpiece W.

The robot controller 40 controls the robot 30 and positions the imaging device 10 at coordinate values instructed by the PLC 50. Thereby, a relative position of the imaging device 10 with respect to the workpiece W continuously changes. In addition, the robot controller 40 controls the robot 30 and causes a direction (imaging direction) in which the imaging device 10 faces to coincide with a direction instructed by the PLC 50. Thereby, a relative orientation of the imaging device 10 with respect to the workpiece W is changed.

The setting device 60 sets positions (imaging positions) and orientations of the imaging device 10 corresponding to a plurality of inspection target positions on the workpiece W and sets a path (designated path) of the imaging device 10 along which the plurality of imaging positions sequentially pass.

The PLC 50 controls the robot controller 40 and the image processing device 20 so that the imaging device 10 sequentially images a plurality of inspection target positions on the workpiece W. The PLC 50 controls the robot controller 40 so that the imaging device 10 continuously moves according to the designated path set by the setting device 60. Thereby, the robot 30 continuously moves the imaging device 10 according to the designated path.

In addition, the PLC 50 controls the image processing device 20 so that an imaging trigger is output immediately before a timing at which the imaging device 10 reaches an imaging position. Thereby, it is possible to sequentially image a plurality of inspection target positions on the workpiece W while continuously moving the imaging device 10.

The robot controller 40 performs compensation control for reducing subject blurring within a predetermined compensation operation period including a predetermined time point t at which an imaging position is reached (a period from a time point t−Δt to a time point t+Δt). Δt is a time suitable for reducing subject blurring and is determined in advance. The compensation control in the present embodiment is a control for changing the orientation of the imaging device 10 in a direction in which a relative movement between a field of view of the imaging device 10 and an inspection target position according to the change in the position on the imaging device 10 along the designated path is canceled out.

Figure 2:
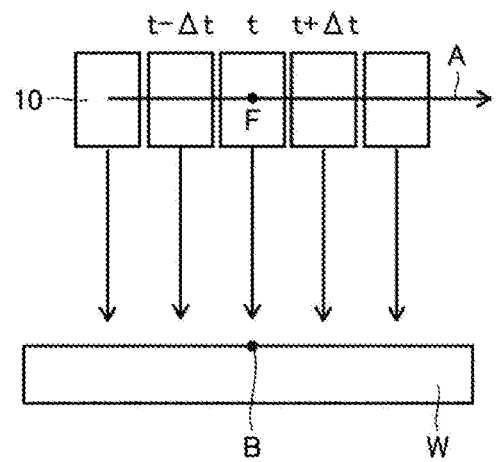
FIG. 2 is a diagram showing changes in the position and the orientation of an imaging device when compensation control is not performed.
Figure 3:
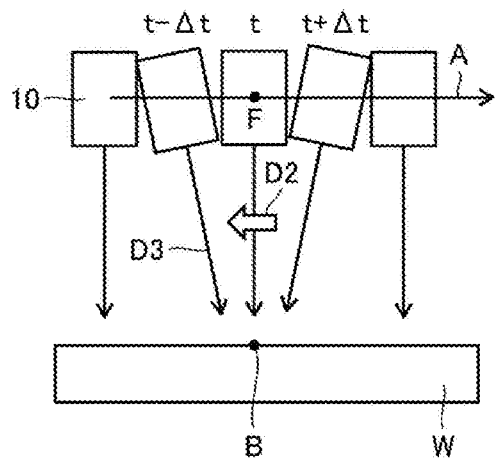
FIG. 3 is a diagram showing changes in the position and the orientation of the imaging device when compensation control is performed.

FIG. 2 is a diagram showing changes in the position and the orientation of an imaging device when compensation control is not performed. FIG. 3 is a diagram showing changes in the position and the orientation of the imaging device when compensation control is performed. The imaging device 10 continuously moves along a designated path A. The imaging device 10 images the workpiece W at a time point t. The time point t is a timing at which the imaging device 10 reaches an imaging position F corresponding to an inspection target position B on the workpiece W.

Figure 4:
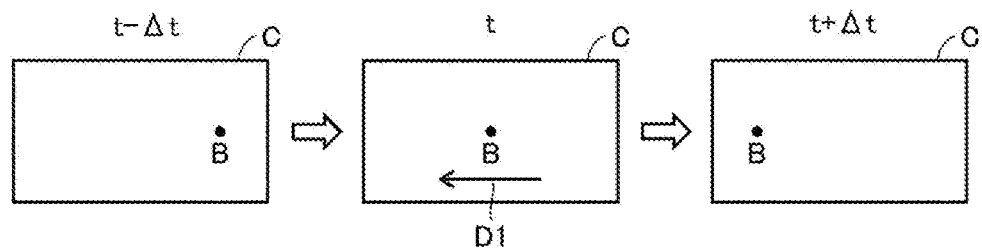
FIG. 4 is a diagram showing an imaging field of view of the imaging device when compensation control is not performed.
Figure 5:
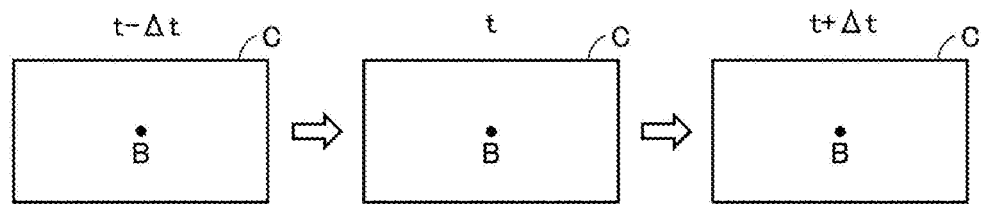
FIG. 5 is a diagram showing an imaging field of view of the imaging device when compensation control is performed.

FIG. 4 is a diagram showing an imaging field of view C of an imaging device when compensation control is not performed. FIG. 5 is a diagram showing the imaging field of view C of the imaging device when compensation control is performed.

As shown in FIG. 2, when compensation control is not performed, the imaging device 10 moves without changing the orientation. As shown in FIG. 4, the inspection target position B is positioned at the center of the imaging field of view C of the imaging device 10 at a time point t at which the imaging device 10 is at the imaging position F. However, the inspection target position B is positioned at one end of the imaging field of view C at the time point t−Δt and positioned at the other end of the imaging field of view C at the time point t+Δt. The inspection target position B relatively moves in a movement direction D1 with respect to the imaging field of view C. Thereby, when the imaging device 10 performs imaging at the time point t at which the imaging position F is reached, subject blurring occurs.

As shown in FIG. 3, when compensation control is performed, the robot controller 40 changes the orientation of the imaging device 10 in a direction in which a relative movement (a movement in the movement direction D1 shown in FIG. 4) between the imaging field of view C of the imaging device 10 and the inspection target position B is canceled out. Specifically, the robot controller 40 rotates an imaging direction D3 in a compensation direction D2 which is a direction opposite to a travelling direction of the designated path A while moving the imaging device 10 along the designated path A from the time point t−Δt to the time point t+Δt. Thereby, as shown in FIG. 5, the inspection target position B is positioned at substantially the same place in the imaging field of view C. That is, at the time point t, a relative movement between the imaging field of view C and the inspection target position B is cancelled out. As a result, even if the workpiece W is imaged while changing a relative position of the imaging device 10 with respect to the workpiece W, it is possible to reduce subject blurring.

§ 2 Specific Example

Next, an example of an appearance inspection system according to the present embodiment will be described.

<A. Configuration of Setting Device>

Figure 6:
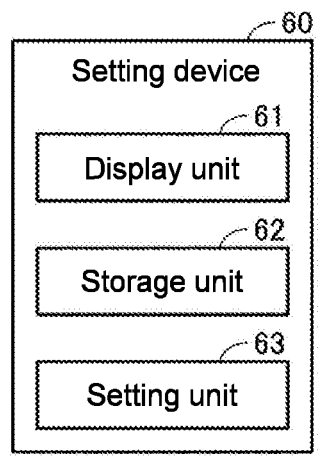
FIG. 6 is a block diagram showing an example of an internal configuration of a setting device shown in FIG. 1.

FIG. 6 is a block diagram showing an example of an internal configuration of the setting device 60. In the example shown in FIG. 6, the setting device 60 includes a display unit 61, a storage unit 62, and a setting unit 63. The display unit 61 is, for example, a touch panel. The setting unit 63 includes a central processing unit (CPU), a random access memory (RAM), a read only memory (ROM), and the like, and sets a designated path according to information processing. The storage unit 62 is, for example, an auxiliary storage device such as a hard disk drive and a solid state drive, and stores a processing program executed in the setting unit 63, data indicating information about setting of a designated path, and the like.

The setting unit 63 reads, for example, 3D design data (for example, computer-aided design (CAD) data) indicating a designed surface of the workpiece W stored in the storage unit 62 and determines a plurality of inspection target positions on the surface indicated by the 3D setting data according to a user input. The setting unit 63 causes a schematic diagram of the workpiece W indicated by the 3D design data to display on the display unit 61, and receives an inspection target position designation input from a user.

Regarding a plurality of inspection target positions, the setting unit 63 sets a position (imaging position) of the imaging device 10 that can perform imaging by adjusting a focus to the inspection target position, and sets a designated path along which the plurality of set imaging positions sequentially pass. In this case, the setting unit 63 sets a designated path that is optimized so that a predetermined requirement is satisfied. For example, when the predetermined requirement is a requirement for minimizing a movement time, the setting unit 63 sets a path candidate having the shortest movement time as a designated path among path candidates that sequentially pass through a plurality of imaging positions. For example, the setting unit 63 may calculate an evaluation value for evaluating an item (for example, a movement time) indicated by a predetermined requirement for each path candidate, and set a designated path based on the calculated evaluation value. In addition, even if there are a plurality of imaging position candidates for each of the plurality of inspection target positions, the setting unit 63 may select one of the plurality of imaging position candidates as an imaging position based on the evaluation values. In this manner, a designated path that is optimized so that a predetermined requirement is satisfied is set.

The setting unit 63 generates information indicating the set designated path. The information indicating the designated path includes XYZ coordinate values of imaging positions, parameters $\theta x$, $\theta y$, and $\theta z$ indicating an orientation of the imaging device 10 at each imaging position, and XYZ coordinate values, $\theta x$, $\theta y$ and $\theta z$ of points on a designated path that which the imaging device 10 should reach at certain time intervals. The XYZ coordinate values are coordinate values in the XYZ coordinate system in which a point on the stage 90 is set as the origin. $\theta x$ is an angle between a line obtained by projecting the optical axis of the imaging device 10 on an XY plane and the X axis. $\theta y$ is an angle between a line obtained by projecting the optical axis of the imaging device 10 on a YZ plane and the Y axis. $\theta z$ is an angle between a line obtained by projecting the optical axis of the imaging device 10 on a ZX plane and the Z axis.

The setting unit 63 may set points on the designated path that the imaging device 10 should reach at certain time intervals so that the imaging device 10 is moved at a predetermined speed along the designated path.

In addition, the setting unit 63 calculates a predetermined time for moving the imaging device 10 from a starting point of the designated path to each imaging position. The predetermined time is calculated based on the predetermined speed and a distance along the designated path from the starting point of the designated path to the imaging position.

Figure 7:
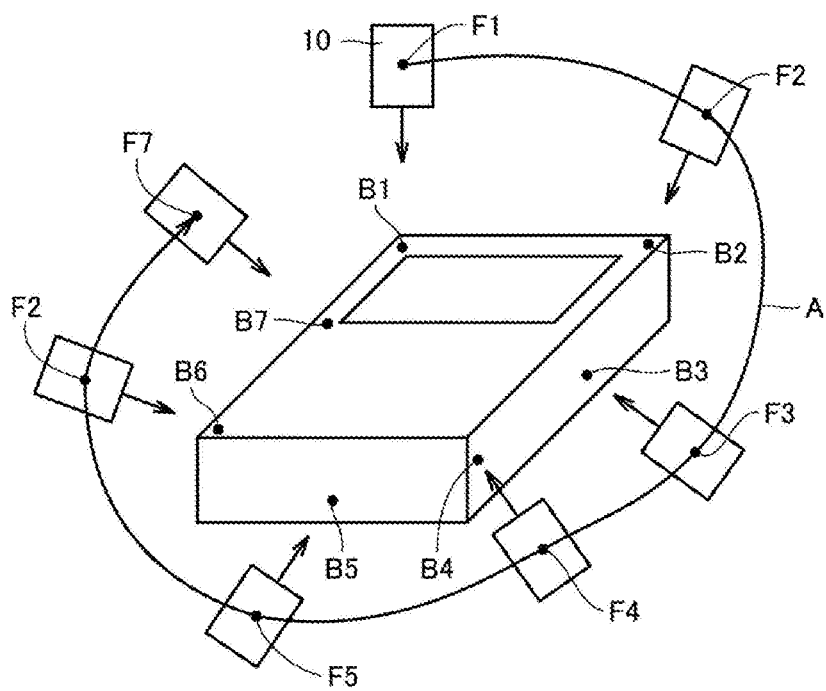
FIG. 7 is a diagram showing an example of a designated path.

FIG. 7 is a diagram showing an example of a designated path. In the example shown in FIG. 7, inspection target positions B1 to B7 are set with respect to the workpiece W, and imaging positions F1 to F7 are set with respect to the inspection target positions B1 to B7. In addition, the designated path A along which the imaging positions F1 to F7 sequentially pass is set.

<B. PLC>

The PLC 50 acquires information indicating the designated path generated by the setting device 60 and outputs an instruction corresponding to the information to the image processing device 20 and the robot controller 40.

The PLC 50 instructs the robot controller 40 regarding XYZ coordinate values, $\theta x$, $\theta y$ and $\theta z$ of points on the designated path that the imaging device 10 should pass at certain time intervals included in the information indicating the designated path generated by the setting device 60 sequentially at the certain time intervals. Thereby, the robot controller 40 and the robot 30 move the imaging device 10 to the position of the instructed XYZ coordinate values, and change the orientation of the imaging device 10 so that the imaging direction match the direction indicated by the instructed $\theta x$, $\theta y$ and $\theta z$.

The PLC 50 acquires XYZ coordinate values, $\theta x$, $\theta y$ and $\theta z$ indicating the actual position and orientation of the imaging device 10 from the robot 30, and compares the acquired XYZ coordinate values, $\theta x$, $\theta y$ and $\theta z$ with XYZ coordinate values, $\theta x$, $\theta y$ and $\theta z$ of the imaging position. The PLC 50 instructs the image processing device 20 so that an imaging trigger is output at a timing at which a difference between the XYZ coordinate values, $\theta x$, $\theta y$ and $\theta z$ acquired from the robot and XYZ coordinate values, $\theta x$, $\theta y$ and $\theta z$ of imaging positions is within a predetermined range. The predetermined range is set in consideration of a movement speed of the imaging device 10, a delay time from an imaging trigger is output until exposure in the imaging device 10 starts, and the like.

<C. Hardware Configuration of Robot Controller>

Figure 8:
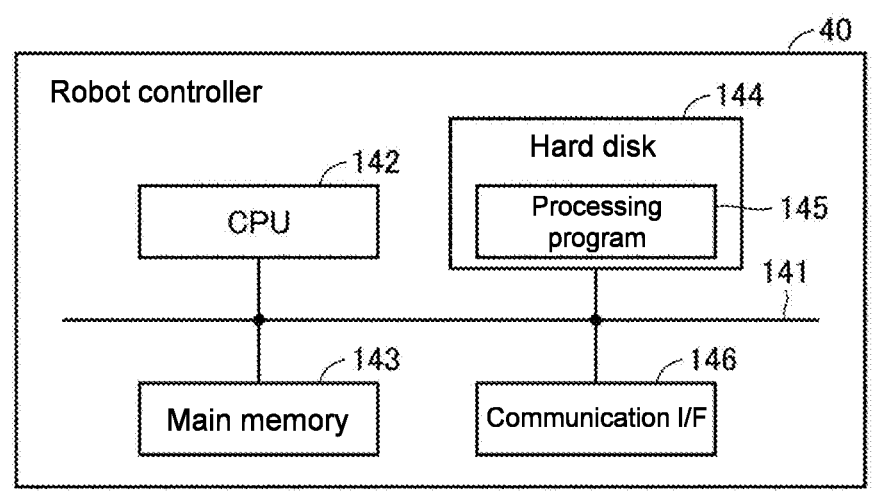
FIG. 8 is a schematic diagram showing a hardware configuration of a robot controller shown in FIG. 1.

FIG. 8 is a schematic diagram showing a hardware configuration of the robot controller 40. The robot controller 40 includes a central processing unit (CPU) 142, a main memory 143, a hard disk 144 and a communication interface (I/F) 146. These units are connected via a bus 141 so that they can communicate data with each other.

The CPU 142 loads programs (codes) including a processing program 145 installed in the hard disk 144 in the main memory 143, executes the programs in a predetermined order, and thus executes various types of calculation. The main memory 143 is typically a volatile storage device such as a dynamic random access memory (DRAM).

The hard disk 144 is an internal memory included in the robot controller 40 and is a nonvolatile storage device, and stores various programs such as the processing program 145. Here, in addition to the hard disk 144, or in place of the hard disk 144, a semiconductor storage device such as a flash memory may be used.

The processing program 145 is a program indicating compensation control procedures performed by the robot controller 40. Various programs such as the processing program 145 are not necessarily stored in the hard disk 144 and may be stored in a server that can communicate with the robot controller 40 or an external memory that can be directly connected to the robot controller 40. For example, an external memory in which various programs executed in the robot controller 40 and various parameters used in various programs are stored is distributed, and the robot controller 40 reads various programs and various parameters from the external memory. The external memory is a medium in which information of the program and the like is accumulated by electrical, magnetic, optical, mechanical, or chemical actions so that computers, other devices, machines, and the like can read information about recorded programs and the like. Alternatively, programs and parameters downloaded from a server or the like connected to the robot controller 40 in a communicable manner may be installed in the robot controller 40.

The communication I/F 146 exchanges various types of data between the PLC 50 and the robot 30. Here, the communication I/F 146 may exchange data between the server and the CPU 142. The communication I/F 146 includes hardware corresponding to a network for exchanging various types of data between the PLC 50 and the robot 30.

Here, the processing program 145 according to the present embodiment may be provided by being incorporated into a part of another program. In addition, alternatively, some or all of processes provided when the processing program 145 is executed may be executed in a dedicated hardware circuit.

<D. Compensation Control>

Compensation control of the robot controller 40 will be described with reference to FIG. 9 and FIG. 10. An operation of the imaging device 10 according to compensation control of the robot controller 40 is referred to as a "compensation operation."

The robot controller 40 adds a predetermined time from a starting point of the designated path to each imaging position at a time point at which the movement of the imaging device 10 along the designated path is started, and thus calculates a predetermined time point at which the imaging device 10 reaches each imaging position. The predetermined time is calculated by the setting unit 63 of the setting device 60. The robot controller 40 may acquire the predetermined time from the setting device 60 in advance.

Figure 9:
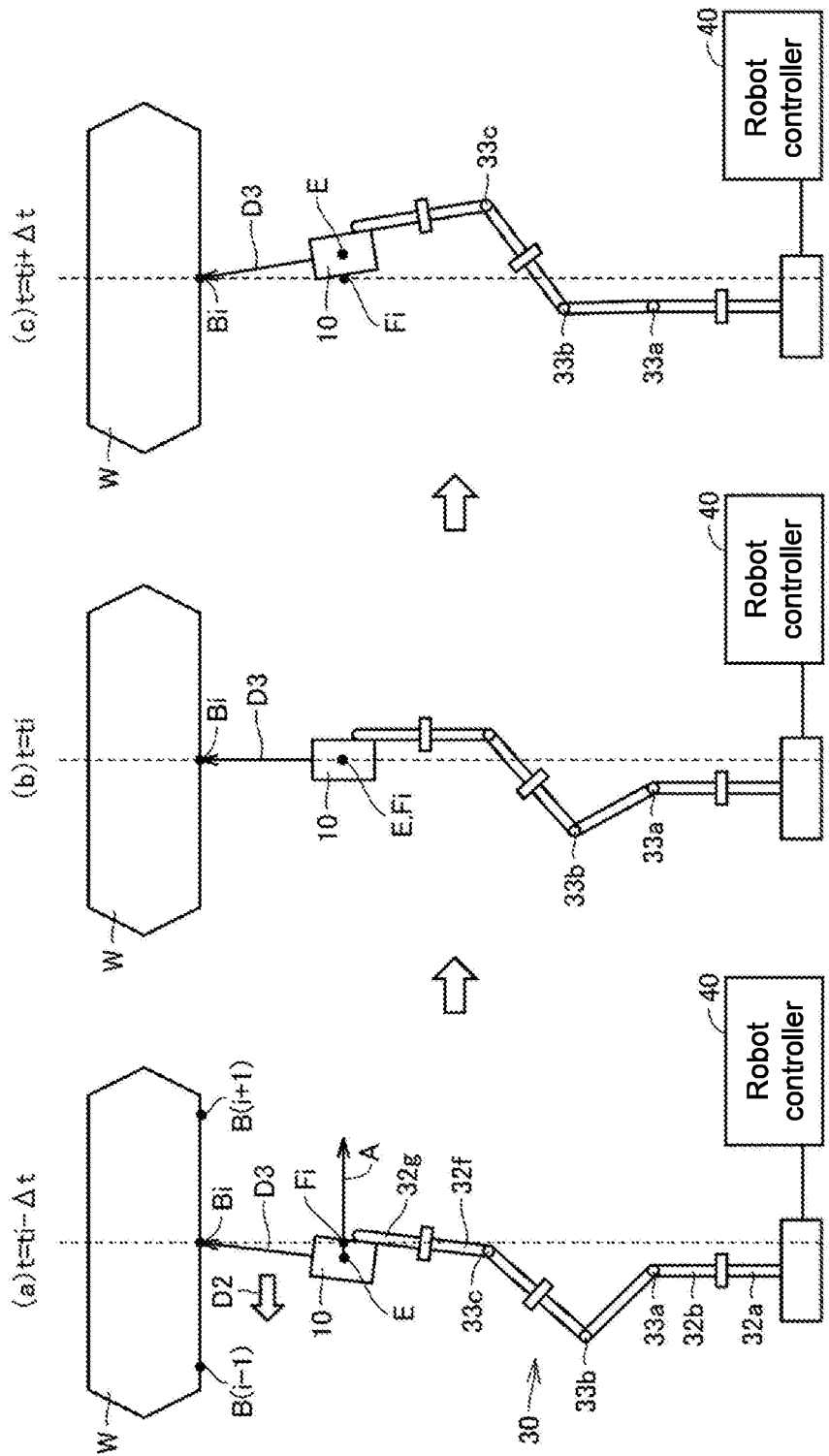
FIG. 9 is a diagram showing an example of a compensation operation in the appearance inspection system shown in FIG. 1.

FIG. 9 is a diagram showing an example of a compensation operation in the appearance inspection system shown in FIG. 1. The robot controller 40 (refer to FIG. 1) controls the robot 30 so that the imaging device 10 moves along the designated path A in order to sequentially image the inspection target positions B(i−1), Bi, and B(i+1) on the workpiece W. FIG. 9 shows an example of compensation operation when the inspection target position Bi is imaged. When a predetermined time point at which the imaging device 10 reaches the imaging position Fi corresponding to the inspection target position Bi is set as ti, (a) of FIG. 9 shows the position and the orientation of the imaging device 10 at the time point ti−Δt. (b) of FIG. 9 shows the position and the orientation of the imaging device 10 at the time point ti. (c) of FIG. 9 shows the position and the orientation of the imaging device 10 at the time point ti+Δt.

In the example shown in FIG. 9, the inspection target positions B(i−1), Bi, and B(i+1), the imaging direction D3 of the imaging device 10, the arms 32a, 32b, 32f and 32g, and the joints 33a and 33c of the robot 30, and the designated path A are positioned on the same plane (the plane of the paper). The joint 33b of the robot 30 is positioned on the back side of the plane of the paper. The imaging direction D3 is a direction along the optical axis of the imaging device 10.

The robot controller 40 controls the robot 30 to move the imaging device 10 along the designated path A. In addition, as shown in (a) of FIG. 9, the robot controller 40 changes the orientation of the imaging device 10 so that the inspection target position Bi is positioned in the imaging direction D3 in a period to the time point ti−Δt. Then, the robot controller 40 starts compensation control for changing the orientation of the imaging device 10 in a direction in which a relative movement between an imaging field of view and the inspection target position Bi is canceled out at the time point ti−Δt.

As shown in (a) to (c) of FIG. 9, the robot controller 40 controls the robot 30 to change the orientation of the imaging device 10 so that the imaging direction D3 is rotated in the compensation direction D2 which is a direction opposite to a travelling direction of the designated path A. Specifically, the robot controller 40 rotates the imaging device 10 about a reference axis E. The reference axis E is an axis that passes through the center point of the imaging device 10 and is orthogonal to the designated path A and the imaging direction D3. Thereby, the imaging device 10 performs a compensation operation to rotate in a direction in which a relative movement between an imaging field of view and an inspection target position B2 is canceled out.

After the compensation operations shown in (a) to (c) of FIG. 9 are performed, the imaging device 10 moves to the vicinity of an imaging position corresponding to a next inspection target position B(i+1) and performs a compensation operation again. In this manner, the imaging device 10 performs a compensation operation for imaging positions corresponding to all inspection target positions.

Figure 10:
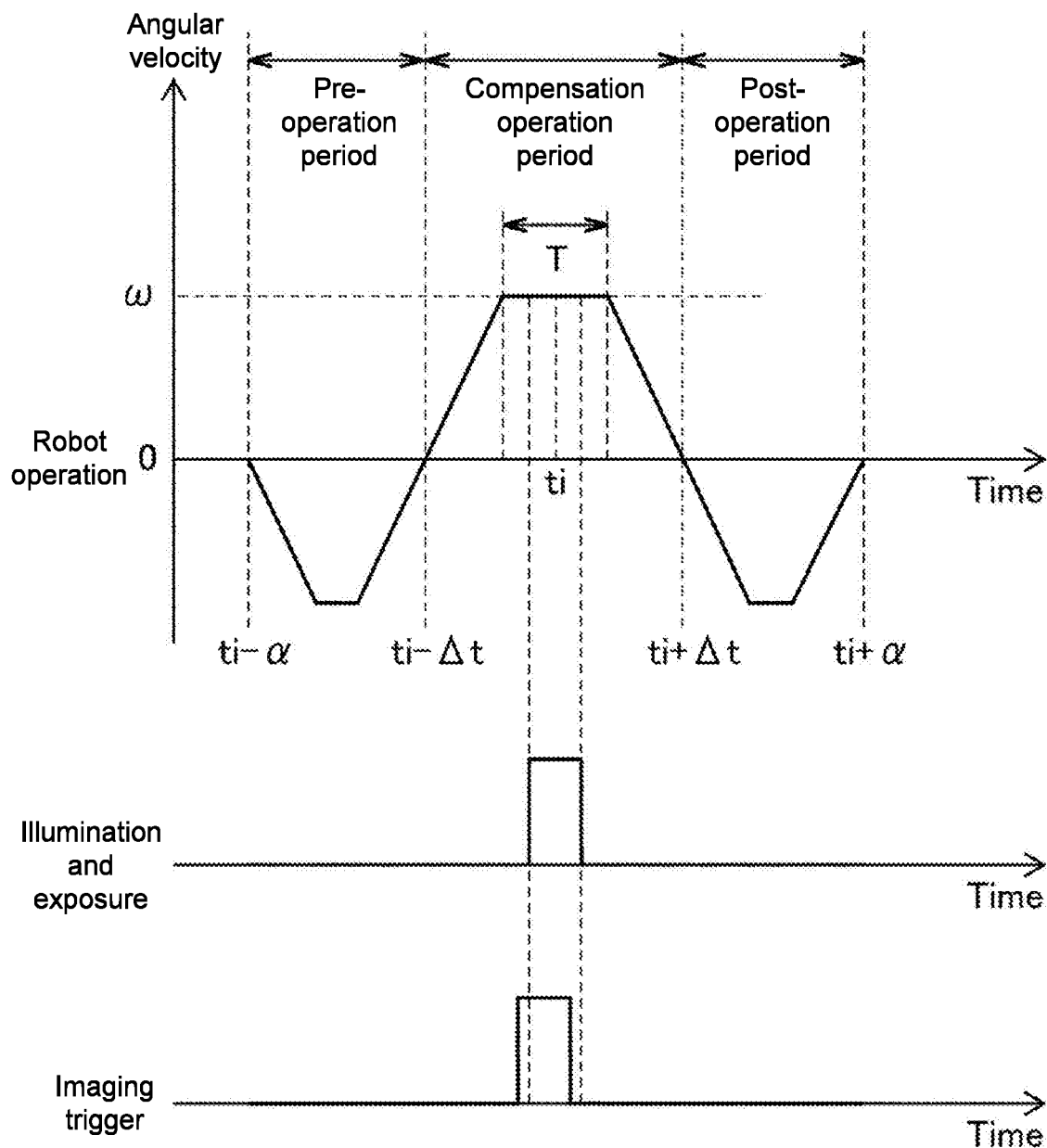
FIG. 10 is a diagram showing change in the angular velocity of the imaging device.

FIG. 10 is a diagram showing changes in the angular velocity of the imaging device, the imaging trigger signal, and the state of the imaging device. As shown in FIG. 10, the robot controller 40 rotates the imaging device 10 about the reference axis E according to a function in which an integral value of the angular velocity from the time point ti−α to the time point ti+α becomes 0. In a period from the time point ti−α to the time point ti−Δt (pre-operation period), the imaging device 10 performs a pre-operation. In a period from the time point ti−Δt to the time point ti+Δt (compensation operation period), the imaging device 10 performs the above compensation operation. In a period from the time point ti+Δt to the time point ti+α (post-operation period), the imaging device 10 performs a post-operation.

Specifically, at the time point ti−α earlier by α than a predetermined time point ti at which the imaging device 10 reaches the imaging position Fi, the robot controller 40 starts rotation of the imaging device 10 about the reference axis E (refer to FIG. 9). α is set to a time longer than Δt. In this case, the robot controller 40 rotates the imaging device 10 so that the imaging direction approaches the inspection target position. Thereby, the imaging device 10 performs a pre-operation to bring the imaging direction close to the inspection target position.

Then, at the time point ti−Δt, the robot controller 40 controls the robot 30 to reverse a rotation direction of the imaging device 10. That is, the imaging device 10 starts a compensation operation to rotate about the reference axis E so that the imaging direction rotates in a compensation direction. The robot controller 40 monotonically increases the angular velocity of the imaging device 10. When a movement speed of the imaging device 10 along the designated path is set as v, and a distance between the inspection target position and the imaging device 10 is set as d, the robot controller 40 changes the angular velocity so that the angular velocity ω in a period T centered on the time point ti at which the imaging device 10 reaches the imaging position becomes v/d (rad/s). Therefore, in the period T centered on the time point ti, a movement of a relative position of the inspection target position with respect to the imaging field of view temporarily stops. The period T is longer than an exposure time of the imaging device 10 and is shorter than 2×Δt.

In the period T, the imaging device 10 that has received an imaging trigger from the image processing device 20 performs illumination and exposure with a predetermined time. A timing at which an imaging trigger is output is set so that a time point in the middle of the exposure time with the imaging device 10 matches the time point ti. That is, in consideration of a movement speed of the imaging device 10, a delay time (for example, several 10 μs) from the output of the imaging trigger to the start of exposure in the imaging device 10, and the like, the PLC 50 controls the image processing device 20 so that the imaging trigger is output at a timing slightly earlier than the time point ti.

After the period T, the robot controller 40 monotonically reduces the angular velocity of the imaging device 10 so that the angular velocity of the imaging device 10 becomes 0 at the time point ti+Δt. At the time point ti+Δt, the robot controller 40 reverses a rotation direction of the imaging device 10 again. Thereby, the imaging device 10 performs a post-operation to bring the imaging direction close to a direction orthogonal to the designated path. The robot controller 40 continues rotation of the imaging device 10 so that the imaging direction is orthogonal to the designated path at the time point ti+α, and stops rotation of the imaging device 10 at the time point ti+α.

In this manner, in a period from the time point ti−Δt to the time point ti+Δt, the inspection target position is positioned in the vicinity of the center of the imaging field of view of the imaging device 10. In addition, at the time point ti, a relative movement between the imaging field of view of the imaging device 10 and the inspection target position is canceled out. As a result, in an image captured at the time point ti at which the imaging device 10 reaches the imaging position, subject blurring is reduced.

<E. Image Processing Device>

The image processing device 20 includes a central processing unit (CPU), a random access memory (RAM), a read only memory (ROM), an auxiliary storage device, a communication I/F, and the like, and performs information processing. The auxiliary storage device includes, for example, a hard disk drive and a solid state drive, and stores programs and the like that the CPU executes.

When an imaging instruction is received from the PLC 50, the image processing device 20 outputs an imaging trigger to the imaging device 10.

The image processing device 20 processes the image captured with respect to an inspection target position, and outputs a result obtained by determining whether the inspection target position is favorable. For example, as described in Japanese Patent Application Laid-open No. 2007-240434, the image processing device 20 binarizes a difference image between images of non-defective workpieces stored in advance, collates the number of pixels that exceed a threshold value with a reference value, and thus determines whether the inspection target position is favorable.

The image processing device 20 displays the determination result on a display device (not shown). Alternatively, the image processing device 20 may display the determination result on the display unit 61 included in the setting device 60.

<F. Flow of Inspection Method in Appearance Inspection System>

Figure 11:
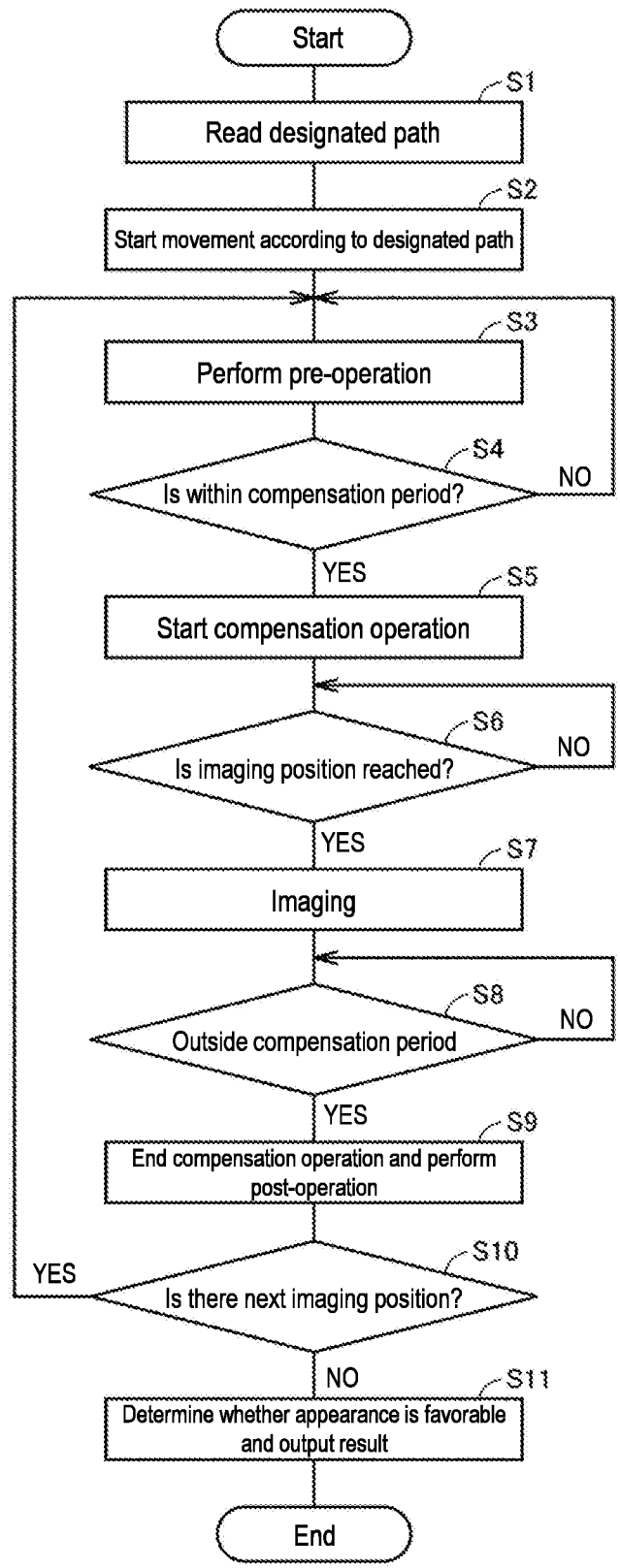
FIG. 11 is a flowchart showing an example of a flow of an inspection method in the appearance inspection system.

FIG. 11 is a flowchart showing an example of a flow of an inspection method in the appearance inspection system 1. In the example shown in FIG. 11, first, in step S1, the PLC 50 reads information indicating the designated path set by the setting device 60.

Next, in step S2, the PLC 50 outputs an instruction for moving the imaging device 10 according to the designated path to the robot controller 40. Specifically, the PLC 50 outputs XYZ coordinate values, θx, θy and θz of points on the designated path that the imaging device 10 should reach at certain time intervals to the robot controller 40 at the certain time intervals. Thereby, the robot controller 40 controls the robot 30 to start movement of the imaging device 10 along the designated path. In addition, the robot controller 40 controls the robot 30 in order to control the orientation of the imaging device 10 so that the imaging direction is orthogonal to the designated path and the imaging direction is directed to the workpiece W.

Next, in step S3, the imaging device 10 performs a pre-operation from the time point t1−α under control of the robot controller 40. The time point t1−α is a time point earlier by an α time than the predetermined time point t1 at which the imaging device 10 reaches the first imaging position. As described above, the pre-operation is an operation to bring the imaging direction close to the inspection target position B1.

Next, in step S4, it is determined whether the time point t1−Δt at which the compensation operation period starts is reached. The time point t1−Δt is a time point earlier by a time Δt than the predetermined time point t1 at which the imaging device 10 reaches the first imaging position. When the time point t1−Δt at which the compensation operation period starts has not been reached (NO in S4), the process returns to step S4.

When the time point t1−Δt is reached (YES in S4), in step S5, the robot controller 40 controls the robot 30 to start a compensation operation of the imaging device 10. As described above, the compensation operation is an operation to rotate about the reference axis E in a direction in which a relative movement between the imaging field of view and the inspection target position is canceled out.

Next, in step S6, it is determined whether the imaging device 10 reaches the imaging position. When the XYZ coordinate values of the imaging device 10 match the XYZ coordinate values of the imaging position, it is determined that the imaging device 10 has reached the imaging position. When the imaging device 10 has not reached the imaging position (NO in S6), the process returns to step S6. When the imaging device 10 has reached the imaging position (YES in S6), in step S7, the imaging device 10 receives an imaging trigger from the image processing device 20 and images the inspection target position on the workpiece W.

Next, in step S8, it is determined whether the time point t1+Δt at the end of the compensation operation period is reached. The time point t1+Δt is a time point later by a time Δt than the predetermined time point t1 at which the imaging device 10 reaches the first imaging position. When the time point t1+Δt at the end of the compensation operation period has not been reached (NO in S8), the process returns to step S8.

When the time point t1+Δt is reached (YES in S8), in step S9, the robot controller 40 controls the robot 30 so that a compensation operation of the imaging device 10 ends and a post-operation is performed. As described above, the post-operation is an operation to bring the imaging direction close to a direction orthogonal to the designated path.

Next, in step S10, the PLC 50 determines whether there is a next imaging position. When there is a next imaging position (YES in S10), steps S3 to S9 are repeated. Here, while steps S3 to S9 with respect to the first imaging position have been described above, in steps S3 to S9 repeated after step S10, a process corresponding to the next imaging position is performed. Thereby, the imaging device 10 can sequentially image a plurality of inspection target positions while moving along the designated path.

When this is no next imaging position (NO in S10), in step S11, the image processing device 20 determines whether the appearance of the workpiece W is favorable based on the image captured by the imaging device 10, and outputs the determination result. Thereby, the process ends.

<G. First Modified Example of Appearance Inspection System>

In the above description, the imaging device 10 performs a compensation operation to rotate in a direction in which a relative movement between the imaging field of view and the inspection target position is canceled out. However, the imaging device 10 may perform a compensation operation to translate in a direction in which a relative movement between the imaging field of view and the inspection target position is canceled out.

Figure 12:
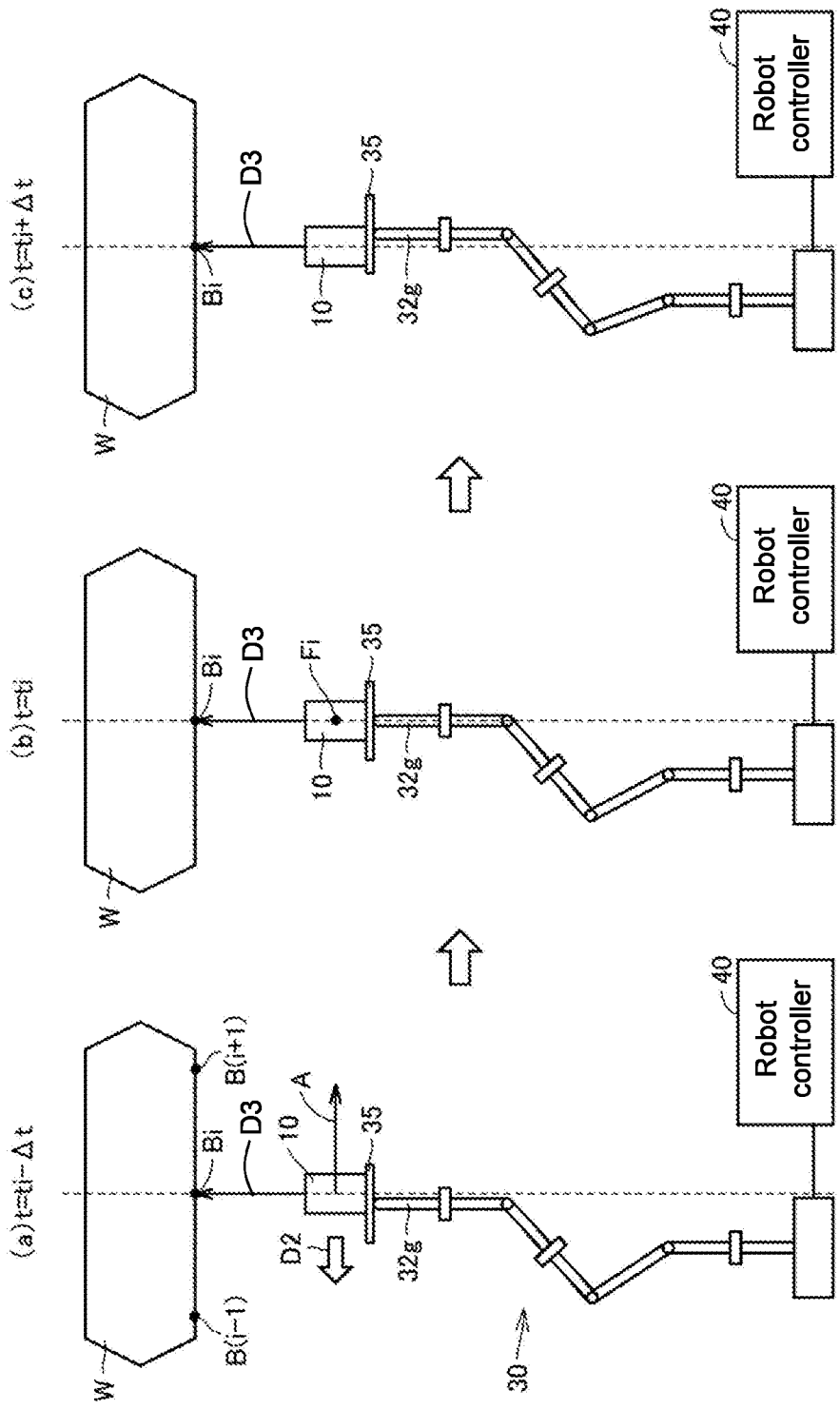
FIG. 12 is a diagram showing an example of a compensation operation in an appearance inspection system according to a first modified example.

FIG. 12 is a diagram showing an example of a compensation operation in an appearance inspection system according to a first modified example. FIG. 12 shows a compensation operation of the imaging device 10 when the inspection target position Bi is imaged. (a) of FIG. 12 shows the position and the orientation of the imaging device 10 at the time point ti−Δt. (b) of FIG. 12 shows the position and the orientation of the imaging device 10 at the time point ti. (c) of FIG. 12 shows the position and the orientation of the imaging device 10 at the time point ti+Δt.

As shown in FIG. 12, the appearance inspection system according to the first modified example includes a slide unit 35 in addition to the robot 30 as a first movement mechanism that moves the imaging device 10. The slide unit 35 is attached to the other end of the arm 32g and supports the imaging device 10 so that it can slide in a predetermined sliding direction.

The robot controller 40 controls the robot 30 to move the slide unit 35 along the designated path A. Here, when it is assumed that the imaging device 10 is fixed to the center of the slide unit 3, the center point of the imaging device 10 is called a "virtual point." The robot controller 40 controls the robot 30 so that the virtual point is positioned at a position (each point on the designated path that the imaging device 10 passes at certain time intervals) instructed by the PLC 50. Thereby, the robot 30 moves the slide unit 35 so that the virtual point passes through points on the designated path that the imaging device 10 passes at certain time intervals.

In addition, as shown in (a) of FIG. 12, in a period to the time point ti−Δt, the robot controller 40 controls the slide unit 35 such that the imaging device 10 is slid to an end on the downstream side in the travelling direction of the designated path A. Then, at the time point ti−Δt, the robot controller 40 starts a compensation control of changing the position of the imaging device 10 in a direction in which a relative movement between the imaging field of view and the inspection target position Bi is canceled out.

As shown in (a) to (c) of FIG. 12, the robot controller 40 controls the slide unit 35 such that the imaging device 10 is slid in the compensation direction D2 which is a direction opposite to a travelling direction of the designated path A. Thereby, the imaging device 10 performs a compensation operation to move in a direction in which a relative movement between the imaging field of view and the inspection target position Bi is canceled out. As shown in (c) of FIG. 12, at the time point ti+Δt, the imaging device 10 reaches an end on the upstream side in the travelling direction of the designated path A on the slide unit 35.

After the compensation operation shown in (a) to (c) of FIG. 12 is performed, the imaging device 10 moves to the vicinity of the imaging position corresponding to the next inspection target position B(i+1) and performs a compensation operation again. In this manner, the imaging device 10 performs a compensation operation for imaging positions corresponding to all inspection target positions.

Figure 13:
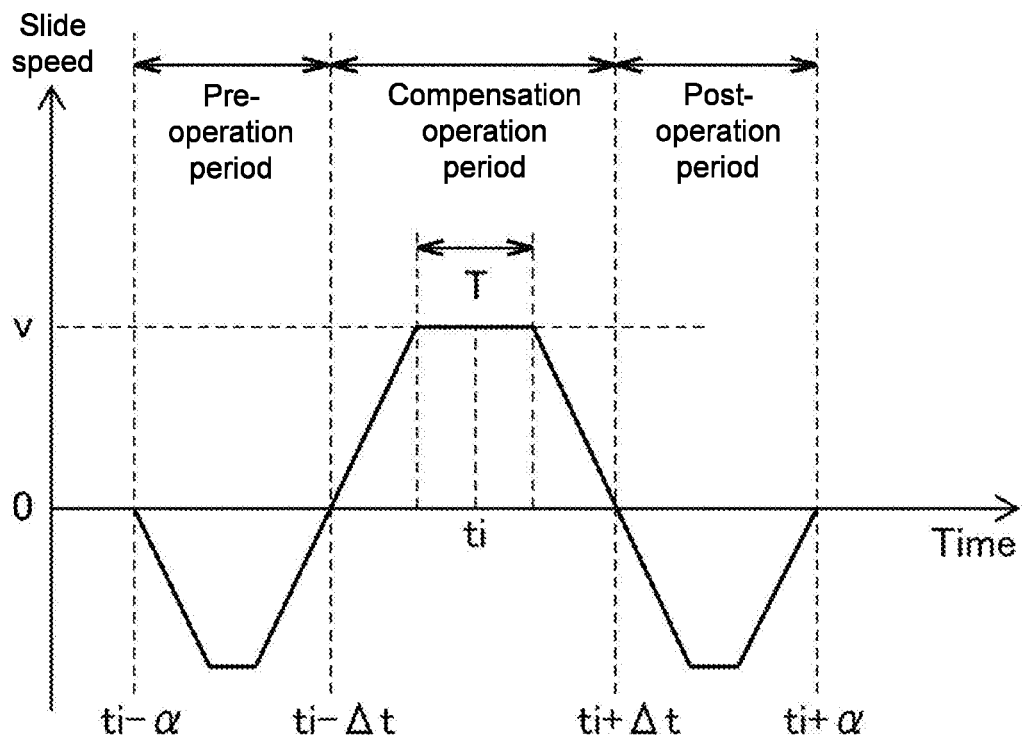
FIG. 13 is a diagram showing change in the relative speed (slide speed) of the imaging device with respect to a slide unit.

FIG. 13 is a diagram showing change in the relative speed (hereinafter referred to as a slide speed) of the imaging device 10 with respect to the slide unit 35. As shown in FIG. 13, the robot controller 40 slides the imaging device 10 according to a function in which an integral value of the slide speed from the time point ti−α to the time point ti+α becomes 0.

At the time point ti−α earlier by α than a predetermined time point ti at which the virtual point reaches the imaging position Fi, the robot controller 40 starts sliding of the imaging device 10 in a travelling direction of the designated path A. Thereby, the imaging device 10 performs a pre-operation to bring the imaging direction close to the inspection target position.

Then, at the time point ti−Δt, the robot controller 40 controls the slide unit 35 to reverse a sliding direction of the imaging device 10. That is, the imaging device 10 starts a compensation operation to slide in a compensation direction opposite to the travelling direction of the designated path. The robot controller 40 monotonically increases a relative speed of the imaging device 10 with respect to the slide unit 35. When a movement speed of the slide unit 35 along the designated path is v, the robot controller 40 changes the slide speed so that a slide speed in the period T centered on the time point ti becomes v. Therefore, in the period T centered on the time point ti, a relative movement of the inspection target position with respect to the imaging field of view of the imaging device 10 temporarily stops.

After the period T, the robot controller 40 monotonically reduces the slide speed so that the slide speed at the time point ti+Δt becomes 0. At the time point ti+Δt, the robot controller 40 reverses a sliding direction of the imaging device 10 again. Thereby, the imaging device 10 performs a post-operation to return to the center of the slide unit 35. The robot controller 40 controls the slide unit 35 so that the imaging device 10 is positioned at the center of the slide unit 35 at the time point ti+α.

<H. Second Modified Example of Appearance Inspection System>

Figure 14:
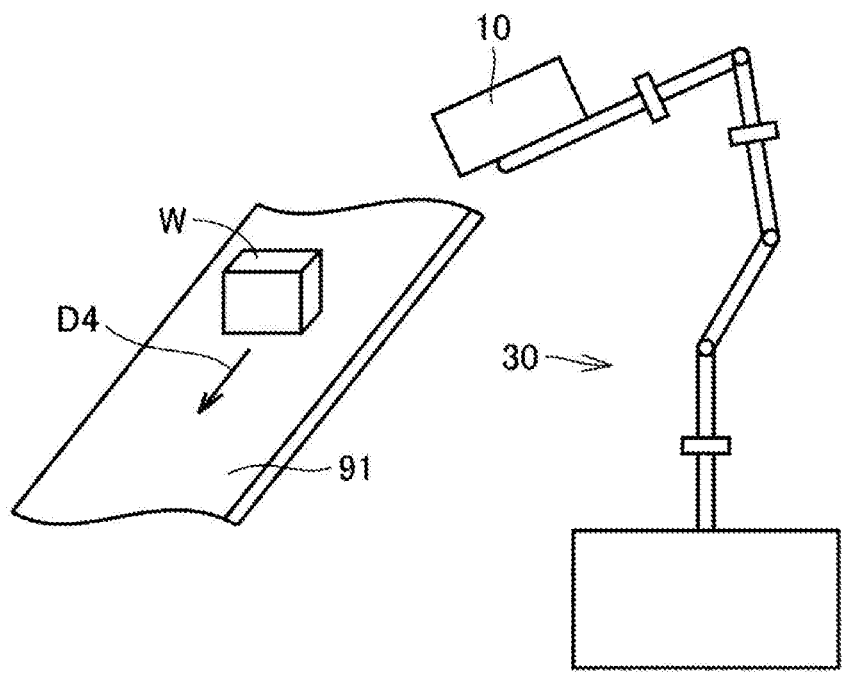
FIG. 14 is a diagram showing an example of a partial configuration of an appearance inspection system according to a second modified example.

FIG. 14 is a diagram showing an example of a partial configuration of an appearance inspection system according to a second modified example. The appearance inspection system in the example shown in FIG. 14 includes a transport belt 91 that moves a workpiece W in a transport direction D4. The transport belt 91 constitutes a second movement mechanism that moves the workpiece W in order to change a relative position of the imaging device 10 with respect to the workpiece W. When a plurality of points on the workpiece W in the transport direction D4 are set as inspection target positions, the setting device 60 may set positions at which a plurality of inspection target positions can be sequentially imaged as designated positions of the imaging device 10. Thereby, the imaging device 10 is fixed to a designated position. However, since the workpiece W moves in the transport direction D4, a relative position of the imaging device 10 with respect to the workpiece W is parallel to the transport direction D4 and changes along a path (designated path) in which a direction opposite to the transport direction D4 is a travelling direction.

Figure 15:
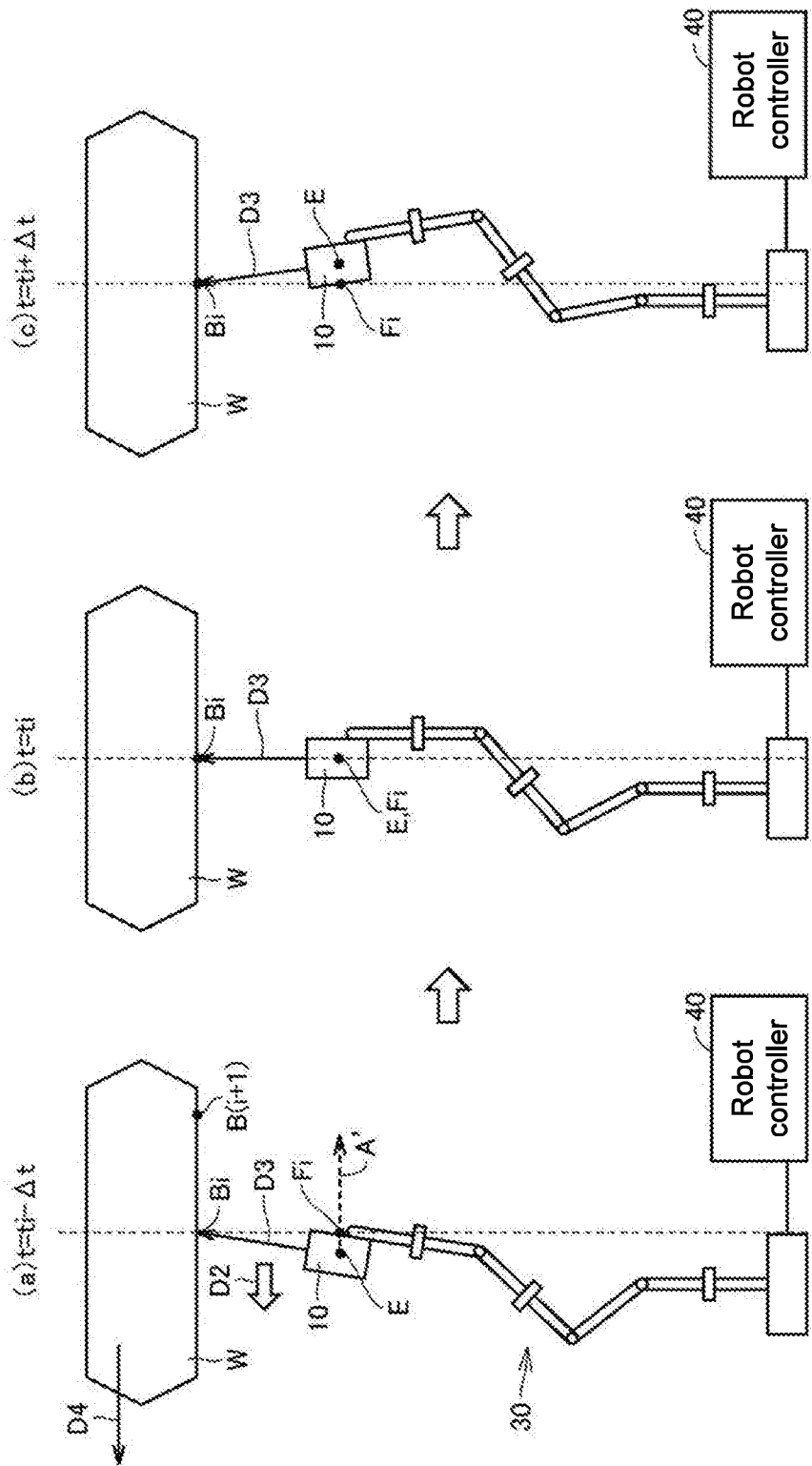
FIG. 15 is a diagram showing an example of a compensation operation in an appearance inspection system according to a second modified example.

FIG. 15 is a diagram showing an example of a compensation operation in the appearance inspection system according to the second modified example. FIG. 15 shows a compensation operation when the inspection target position Bi is imaged. When a predetermined time point at which a relative position of the imaging device 10 with respect to the workpiece W reaches the imaging position Fi is set as ti, a relative position and a relative orientation of the imaging device 10 with respect to the workpiece W at the time point ti−Δt are shown in (a) of FIG. 15. A relative position and a relative orientation of the imaging device 10 with respect to the workpiece W at the time point ti are shown in (b) of FIG. 15. A relative position and a relative orientation of the imaging device with respect to the workpiece W at the time point ti+Δt are shown in (c) of FIG. 15. Here, while the imaging device 10 is substantially fixed at the designated position in the appearance inspection system according to the second modified example, a direction in which a relative position of the imaging device 10 with respect to the workpiece W changes is indicated by an arrow A'. That is, the arrow A' virtually indicates a path of the relative position of the imaging device 10 with respect to the workpiece W.

As shown in (a) of FIG. 15, in a period to the time point ti−Δt, the robot controller 40 controls the robot 30 to change the orientation of the imaging device 10 so that the inspection target position Bi is positioned in the imaging direction D3. Then, the robot controller 40 starts a compensation control of changing the orientation of the imaging device 10 in a direction in which a relative movement between the imaging field of view and the inspection target position Bi is canceled out at the time point ti−Δt.

As shown in (a) to (c) of FIG. 15, the robot controller 40 controls the robot 30 to change the orientation of the imaging device 10 so that the imaging direction D3 rotates in the compensation direction D2 which is a direction opposite to the arrow A'. Specifically, the robot controller 40 rotates the imaging device 10 about the reference axis E. Thereby, the imaging device 10 performs a compensation operation to rotate in a direction in which a relative movement between the imaging field of view and the inspection target position Bi is canceled out.

After the compensation operation shown in (a) to (c) of FIG. 15 is performed, the imaging device 10 moves to the vicinity of an imaging position corresponding to the next inspection target position B(i+1) and performs a compensation operation again. In this manner, the imaging device 10 performs a compensation operation for imaging positions corresponding to all inspection target positions.

The change in the angular velocity of the imaging device 10 in the appearance inspection system according to the second modified example is similar to that of the above embodiment. That is, the imaging device 10 may rotate about the reference axis E according to a function of the angular velocity shown in FIG. 10.

Specifically, to the time point ti−α, the imaging device 10 is held with an orientation in which the imaging direction is a direction orthogonal to the transport direction D4. The imaging device 10 performs a pre-operation to rotate so that the imaging direction approaches the inspection target position in a pre-operation period from the time point ti−α to the time point ti−Δt. In a compensation operation period from the time point ti−Δt to the time point ti+Δt, the imaging device 10 performs a compensation operation to rotate about the reference axis E so that the imaging direction rotates in the compensation direction. When a movement speed of the workpiece W is set as v and a distance between the inspection target position and the imaging device 10 is set as d, the angular velocity of the imaging device 10 in the period T centered on the time point ti becomes v/d (rad/s). Therefore, at the time point ti, a relative movement of the inspection target position with respect to the imaging field of view of the imaging device 10 temporarily stops. In a post-operation period from the time point ti+Δt to the time point ti+α, the imaging device 10 performs a post-operation to return to an orientation in which the imaging direction is a direction orthogonal to the transport direction D4.

<I. Third Modified Example of Appearance Inspection System>

An appearance inspection system according to a third modified example is different from the appearance inspection system according to the second modified example in that the position of the imaging device 10 is changed in the compensation operation rather than the orientation thereof.

Figure 16:
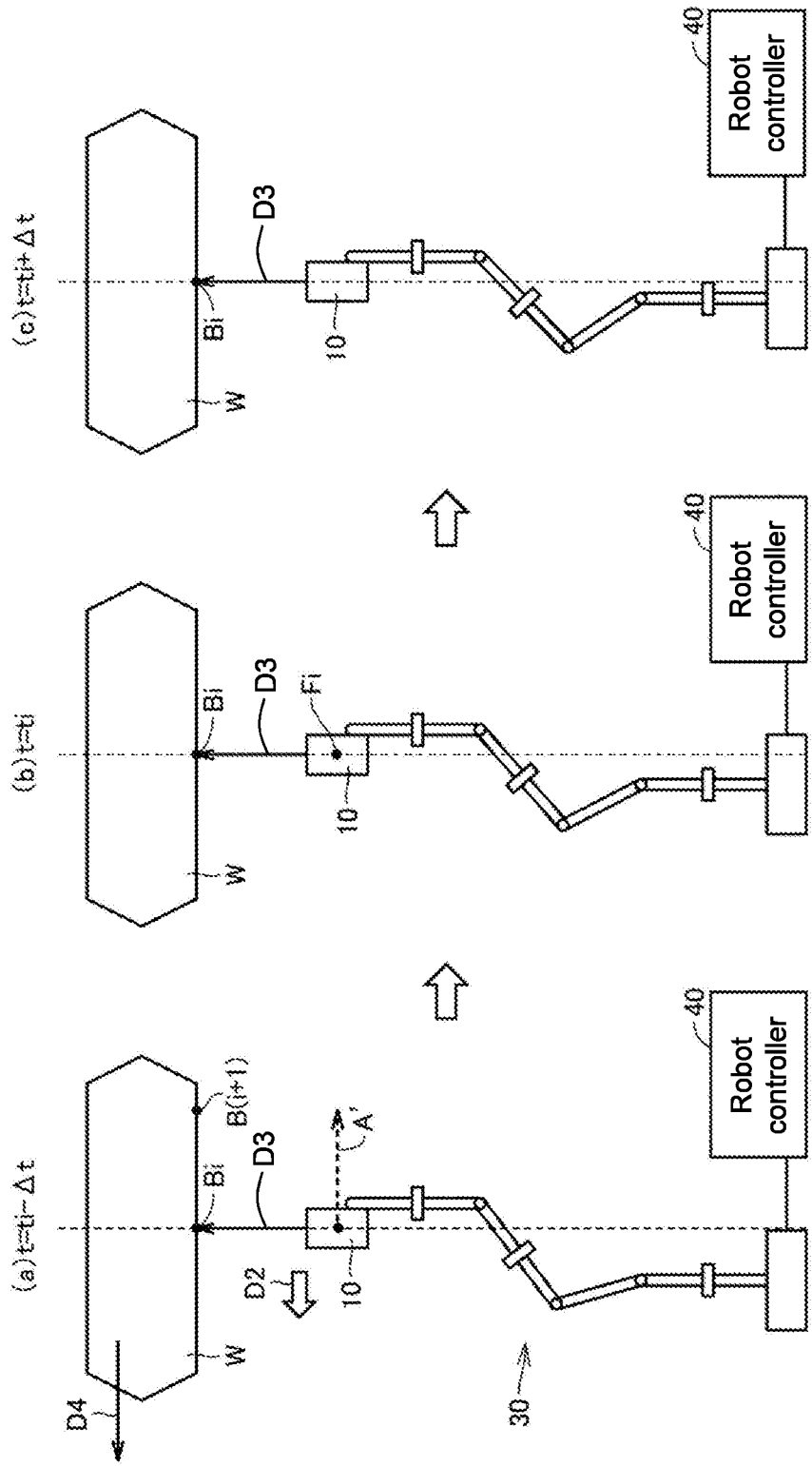
FIG. 16 is a diagram showing an example of a compensation operation in an appearance inspection system according to a third modified example.

FIG. 16 is a diagram showing an example of a compensation operation of the appearance inspection system according to the third modified example. FIG. 16 shows a compensation operation when the inspection target position Bi is imaged. When a predetermined time point at which a relative position of the imaging device 10 with respect to the workpiece W reaches the imaging position Fi is set as ti, a relative position and a relative orientation of the imaging device 10 with respect to the workpiece W at the time point ti−Δt are shown in (a) of FIG. 16. A relative position and a relative orientation of the imaging device 10 with respect to the workpiece W at the time point ti are shown in (b) of FIG. 16. A relative position and a relative orientation of the imaging device with respect to the workpiece W at the time point ti+Δt are shown in (c) of FIG. 16. Here, while the imaging device 10 is substantially fixed at the designated position in the appearance inspection system according to the third modified example, a direction in which a relative position of the imaging device 10 with respect to the workpiece W changes is indicated by an arrow A'. That is, the arrow A' virtually indicates a travelling direction of a path of a relative position of the imaging device 10 with respect to the workpiece W.

As shown in (a) of FIG. 16, in a period to the time point ti−Δt, the robot controller 40 controls the robot 30 to change the position of the imaging device 10 so that the inspection target position Bi is positioned in the imaging direction D3. Then, the robot controller 40 starts a compensation control of changing the position of the imaging device 10 in a direction in which a relative movement between the imaging field of view and the inspection target position Bi is canceled out at the time point ti−Δt.

As shown in (a) to (c) of FIG. 16, the robot controller 40 controls the robot 30 to translate the imaging device 10 in the compensation direction D2 which is a direction opposite to the arrow A'. Thereby, the imaging device 10 performs translating in a direction in which a relative movement between the imaging field of view and the inspection target position B2 is canceled out.

After the compensation operations shown in (a) to (c) of FIG. 16 are performed, the imaging device 10 moves to the vicinity of an imaging position corresponding to the next inspection target position B(i+1) and performs a compensation operation again. In this manner, the imaging device 10 performs a compensation operation for imaging positions corresponding to all inspection target positions.

The change in the translation speed of the imaging device 10 in the third modified example is similar to the change in the slide speed of the first modified example shown in FIG. 15. That is, the imaging device 10 may move in the compensation direction D2 according to a function similar to the function of the slide speed shown in FIG. 15.

Specifically, the imaging device 10 is positioned at a designated position set by the setting device 60 until the time point ti−α. In a pre-operation period from the time point ti−α to the time point ti−Δt, the imaging device 10 performs a pre-operation to move in a direction of the arrow A' from the designated position. In a compensation operation period from the time point ti−Δt to the time point ti+Δt, the imaging device 10 moves in the compensation direction D2 which is a direction opposite to the arrow A'. A movement speed of the imaging device 10 in the period T centered on the time point ti is the same as the movement speed of the workpiece W. Therefore, in the period T centered on the time point ti, a relative movement of the inspection target position with respect to the imaging field of view of the imaging device 10 temporarily stops. In a post-operation period from the time point ti+Δt to the time point ti+α, the imaging device 10 performs a post-operation to return to the designated position.

<J. Fourth Modified Example of Appearance Inspection System>

Figure 17:
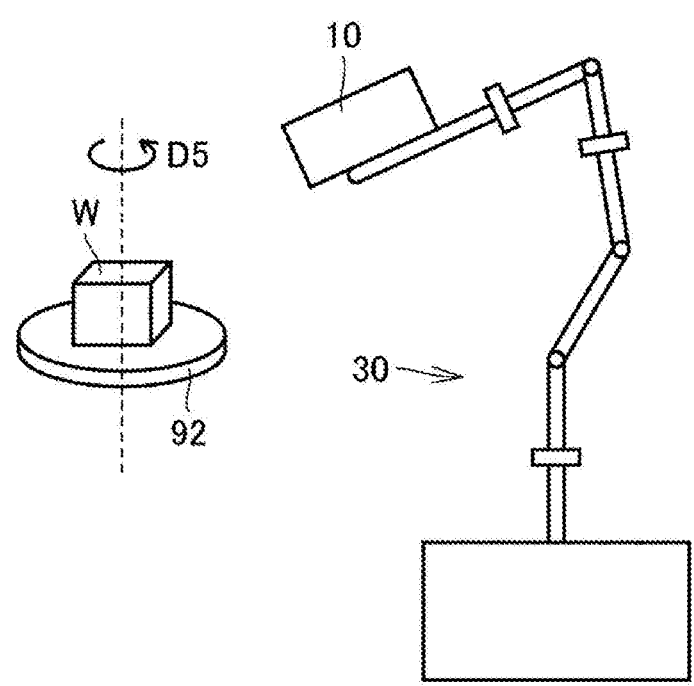
FIG. 17 is a diagram showing an example of a partial configuration of an appearance inspection system according to a fourth modified example.

FIG. 17 is a diagram showing an example of a partial configuration of an appearance inspection system according to a fourth modified example. The appearance inspection system in the example shown in FIG. 17 includes a rotary table 92 configured to rotate a workpiece W in a rotation direction D5. The rotary table 92 constitutes a second movement mechanism that moves the workpiece W in order to change a relative position of the imaging device 10 with respect to the workpiece W. When a plurality of points on the workpiece W in the rotation direction D5 are set as inspection target positions, the setting device 60 may set positions at which a plurality of inspection target positions can be sequentially imaged as designated positions of the imaging device 10. Thereby, the imaging device 10 is fixed to a designated position. However, since the workpiece W moves in the rotation direction D5, a relative position of the imaging device 10 with respect to the workpiece W forms an arc shape around a rotation shaft of the rotary table 92 and changes along a path in which a direction opposite to the rotation direction D5 is a travelling direction.

Figure 18:
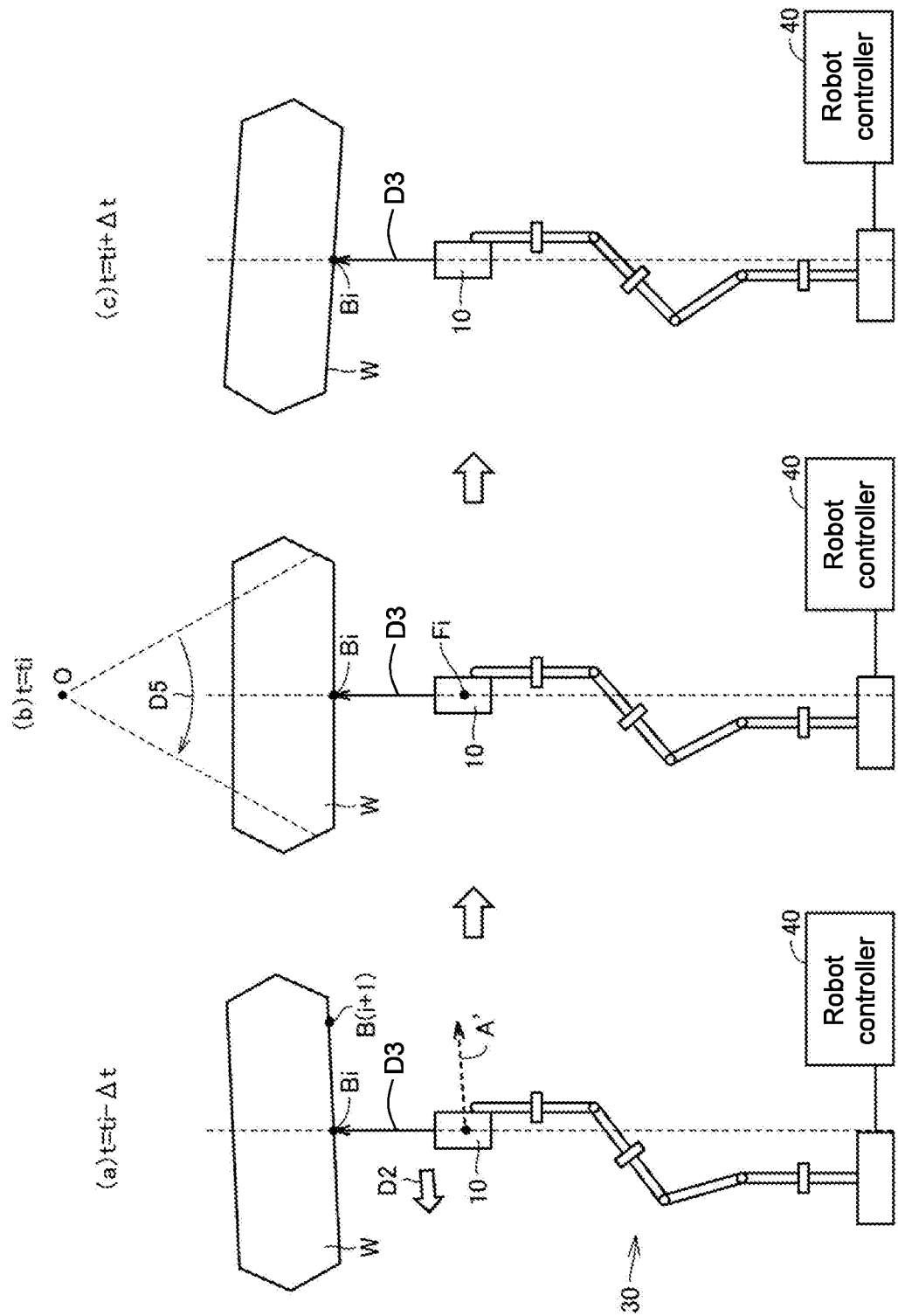
FIG. 18 is a diagram showing an example of a compensation operation in the appearance inspection system according to the fourth modified example.

FIG. 18 is a diagram showing an example of a compensation operation of the appearance inspection system according to the fourth modified example. FIG. 18 shows a compensation operation when the inspection target position Bi is imaged. When a predetermined time point at which a relative position of the imaging device 10 with respect to the workpiece W reaches the imaging position Fi is set as ti, a relative position and a relative orientation of the imaging device 10 with respect to the workpiece W at the time point ti−Δt are shown in (a) of FIG. 18. A relative position and a relative orientation of the imaging device 10 with respect to the workpiece W at the time point ti are shown in (b) of FIG. 18. A relative position and a relative orientation of the imaging device with respect to the workpiece W at the time point ti+Δt are shown in (c) of FIG. 18. Here, while the imaging device 10 is substantially fixed at the designated position in the appearance inspection system according to the fourth modified example, a direction in which a relative position of the imaging device 10 with respect to the workpiece W changes is indicated by an arrow A'. That is, the arrow A' virtually indicates a travelling direction of a path of a relative position of the imaging device 10 with respect to the workpiece W.

As shown in (a) of FIG. 18, in a period to the time point ti−Δt, the robot controller 40 controls the robot 30 to change the position of the imaging device 10 so that the inspection target position Bi is positioned in the imaging direction D3. Then, the robot controller 40 starts a compensation control of changing the position of the imaging device 10 in a direction in which a relative movement between the imaging field of view and the inspection target position Bi is canceled out at the time point ti−Δt.

As shown in (a) to 18(c) of FIG. 18, the robot controller 40 controls the robot 30 to move the imaging device 10 in the compensation direction D2 which is a direction opposite to the arrow A'. Thereby, the imaging device 10 performs a compensation operation to move in a direction in which a relative movement between the imaging field of view and the inspection target position Bi is canceled out.

After the compensation operations shown in (a) to 18(c) of FIG. 18 are performed, the imaging device 10 moves to the vicinity of an imaging position corresponding to the next inspection target position B(i+1) and performs a compensation operation again. In this manner, the imaging device 10 performs a compensation operation for imaging positions corresponding to all inspection target positions.

Figure 19:
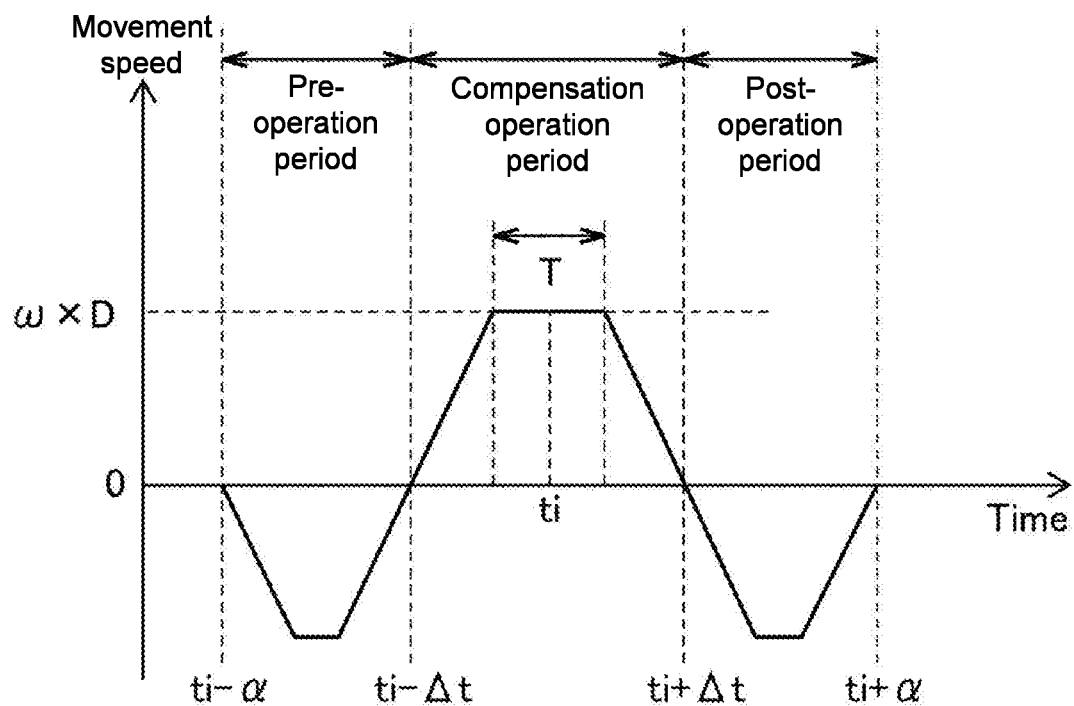
FIG. 19 is a diagram showing change in the movement speed of the imaging device.

FIG. 19 is a diagram showing change in the movement speed of the imaging device 10. As shown in FIG. 19, the robot controller 40 moves the imaging device 10 according to a function in which an integral value of the movement speed from the time point ti−α to the time point ti+α becomes 0.

At the time point ti−α earlier by α than a predetermined time point ti at which a relative position of the imaging device 10 with respect to the workpiece W reaches the imaging position Fi, the robot controller 40 starts movement of the imaging device 10 in the direction of the arrow A'. Thereby, the imaging device 10 performs a pre-operation to bring the imaging direction close to the inspection target position Bi.

Then, at the time point ti−Δt, the robot controller 40 controls the robot 30 to reverse a movement direction of the imaging device 10. That is, the imaging device 10 starts a compensation operation to move in the compensation direction. The robot controller 40 monotonically increases the movement speed of the imaging device 10. When the angular velocity of the workpiece W is set as ω and a distance between a rotation shaft O of the rotary table 92 and the imaging device 10 is set as D, the robot controller 40 changes a movement speed of the imaging device 10 so that a movement speed of the imaging device 10 in the period T centered on the time point ti becomes ω×D. Therefore, in the period T centered on the time point ti, a relative movement of the inspection target position Bi with respect to the imaging field of view of the imaging device 10 temporarily stops.

After the period T, the robot controller 40 monotonically reduces the movement speed of the imaging device 10 so that the movement speed at the time point ti+Δt becomes 0. At the time point ti+Δt, the robot controller 40 reverses a movement direction of the imaging device 10 again. Thereby, the imaging device 10 performs a post-operation to return to the designated position. The robot controller 40 controls the robot 30 so that the imaging device 10 is positioned at the designated position at the time point ti+α.

<K. Modified Example of Compensation Control>

Figure 20:
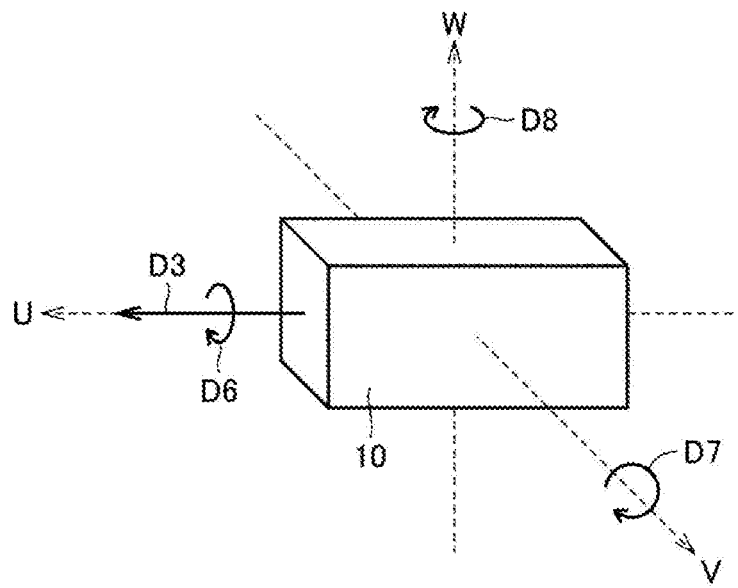
FIG. 20 is a diagram showing operations of the imaging device.

FIG. 20 is a diagram showing operations of the imaging device 10. FIG. 20 shows a UVW coordinate system which is a local coordinate system unique to the imaging device 10. The imaging direction D3 of the imaging device 10 is positioned on the U axis. The V axis and the W axis pass through points within the imaging device 10 and are perpendicular to the U axis. The V axis and the W axis are orthogonal to each other.

The operation of the imaging device 10 can be decomposed into (1) a linear movement in a direction parallel to the U axis, (2) a linear movement in a direction parallel to the V axis, (3) a linear movement in a direction parallel to the W axis, (4) a rotational movement with the U axis as a rotation axis (rotational movement in a roll direction D6), (5) a rotational movement with the V axis as rotation axis (a rotational movement in a pitch direction D7), and (6) a rotational movement with the W axis as a rotation axis (a rotational movement in a yaw direction D8).

When a path (designated path) of the relative position of the imaging device 10 with respect to the workpiece W is perpendicular to the imaging direction D3, according to at least one of the above (2) and (3) linear movements, it is possible to completely compensate for a movement of the relative position along the designated path. Alternatively, according to at least one of the above (5) and (6) rotational movements, it is possible to approximately compensate for a movement of the relative position along the designated path. When a rotation angle of the imaging device 10 in the compensation operation is small, a relative movement between the imaging field of view and the inspection target position can be canceled out with high accuracy. However, when the angle of the rotational movement of the imaging device 10 in the compensation operation increases, it is not possible to cancel out a relative movement between the imaging field of view and the inspection target position with high accuracy.

When a path (designated path) of the relative position of the imaging device 10 with respect to the workpiece W is parallel to the imaging direction D3, according to the above (1) linear movement, it is possible to completely compensate for a movement of the relative position along the designated path. Alternatively, when a zoom magnification of the imaging device 10 is variable, if the zoom magnification is adjusted, it is possible to approximately compensate for a movement of the relative position along the designated path. In this case, a focal position of the imaging device 10 is adjusted. However, the zoom magnification and the focal position are adjusted in synchronization with a timing at which the imaging device 10 reaches the imaging position. In addition, in a compensation operation period from the time point ti−Δt to the time point ti+Δt, the zoom magnification and the focal position may be controlled so that they change linearly.

In addition, when a relative position of the imaging device 10 with respect to the workpiece W is changed along the designated path, a relative orientation of the imaging device 10 with respect to the workpiece W may also be changed. When a direction in which the relative orientation changes is a rotation direction around the U axis, according to the above (4) rotational movement, it is possible to completely compensate for the change in the relative orientation. When a direction in which the relative orientation changes is different from a rotation direction around the U axis, according to at least one of the above (5) and (6) rotational movements, it is possible to completely compensate for the change in the relative orientation.

Here, as a method of changing a relative orientation of the imaging device 10 with respect to the workpiece W, a method in which an optical axis direction of the imaging device 10 is changed according to control in the imaging device 10 is also used in addition to a method using a mechanism (for example, the robot 30) different from that of the imaging device 10. For example, in some types of liquid lens, an optical axis direction can be controlled by changing a voltage applied to an electrode. When an imaging device including such a liquid lens is used, if a voltage applied to an electrode of a liquid lens is controlled, the optical axis direction of the imaging device 10 can be changed without using the robot 30.

<L. Modified Example of Setting Device>

The setting device 60 may set a designated path that the imaging device 10 easily performs a compensation operation. A form in which the imaging device 10 is slidably supported by the slide unit 35 will be exemplified below (refer to FIG. 12).

The slide unit 35 can slide the imaging device 10 only in a predetermined sliding direction. In the example shown in FIG. 12, the sliding direction is perpendicular to an imaging direction (a direction along the optical axis) of the imaging device 10. When a travelling direction of the designated path and the sliding direction are orthogonal to each other, the robot controller 40 cannot perform compensation control for changing the position of the imaging device 10 in a direction in which a relative movement between a field of view of the imaging device 10 and the inspection target position according to a movement of the slide unit 35 along the designated path is canceled out. Therefore, in order for the robot controller 40 to reliably perform compensation control, the setting device 60 sets a designated path so that an angle formed by a travelling direction of the designated path at the imaging position and the sliding direction is less than 10 degrees. The travelling direction of the designated path is the same as the movement direction of the relative position of the imaging device 10 with respect to the workpiece W.

Figure 21:
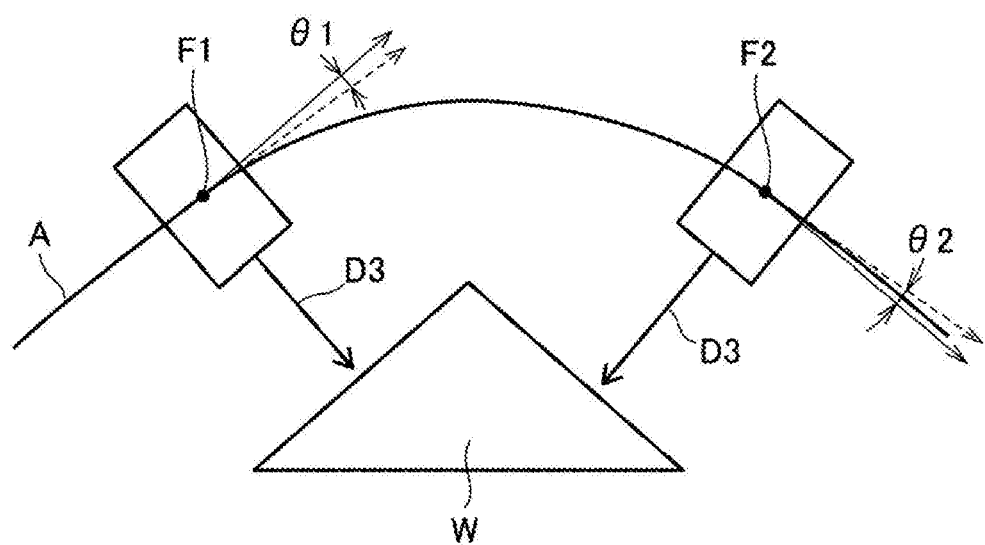
FIG. 21 is a diagram showing the relationship between a travelling direction of a designated path and a sliding direction.

FIG. 21 is a diagram showing the relationship between a travelling direction of a designated path and a sliding direction. In FIG. 21, a solid line arrow indicates a sliding direction and a dotted line arrow indicates a travelling direction of the designated path A. The setting device 60 sets a designated path so that an angle θ1 formed by a travelling direction of the designated path at the imaging position F1 and a sliding direction and an angle θ2 formed by a travelling direction of the designated path at the imaging position F2 and a sliding direction are less than 10 degrees. The travelling direction of the designated path at the imaging position is a direction along the tangent of the designated path at the imaging position.

The setting unit 63 of the setting device 60 may select a path candidate that satisfies a requirement that an angle formed by a travelling direction of a designated path at each imaging position and a sliding direction be less than 10 degrees as a designated path from among path candidates in which a plurality of imaging positions are connected. When there are a plurality of path candidates that satisfy this requirement, the setting unit 63 may set one of the plurality of path candidates as a designated path based on an evaluation value for evaluating an item indicated by a predetermined requirement.

In the compensation operations shown in FIG. 9, FIG. 15, FIG. 16 and FIG. 18, due to restrictions of the robot 30, a designated path is similarly set also when a direction in which a compensation operation can be performed is limited. That is, the setting unit 63 sets a path candidate in which an angle formed by a travelling direction of a designated path at each imaging position and a direction in which a compensation operation can be performed is less than 10 degrees as a designated path among path candidates in which a plurality of imaging positions are connected.

<M. Other Modified Examples>

In the above description, the appearance inspection system 1 includes the robot 30 which is a vertical articulated robot as a first movement mechanism for moving the imaging device 10. However, the appearance inspection system 1 may include, for example, a 3-axis orthogonal robot, as a first movement mechanism for moving the imaging device 10. In this case, the first movement mechanism further includes the slide unit 35 as shown in FIG. 12 or an angle adjustment mechanism that rotatably supports the imaging device 10 and adjusts an angle in a field of view direction of the imaging device 10 with respect to the Z axis in addition to the 3-axis orthogonal robot. The slide unit 35 or the angle adjustment mechanism is attached to the orthogonal robot. The robot controller 40 moves the slide unit 35 or the angle adjustment mechanism along the designated path, and controls the slide unit 35 or the angle adjustment mechanism at an imaging position, and performs a compensation operation of the imaging device 10.

In the example shown in FIG. 9, the imaging direction D3 of the imaging device 10, the arms 32a, 32b, 32f, and 32g and the joints 33a and 33c of the robot 30 are positioned on the same plane. However, the operation of the robot 30 is not limited thereto. The arms 32a to 32g and the joints 33a to 33c may be positioned on the same plane, and the arm 32a (32b) and the arm 32c, and the arm 32d (32e) and the arm 32f (32g) may be positioned at positions twisted from each other.

In the above description, the robot controller 40 performs a compensation control for reducing subject blurring in a predetermined compensation operation period including a predetermined time point ti at which the imaging position is reached (a period from the time point ti−Δt to the time point ti+Δt). However, the robot controller 40 may start compensation control complementarily using position information of the robot 30. For example, the robot 30 has an encoder attached to each of the joints 33a to 33c and the rotation shafts 34a to 34c, generates position information indicating the current position and orientation, and outputs it to the robot controller 40. The robot controller 40 corrects the predetermined time point ti at which the imaging device 10 reaches the imaging position based on current position information and information indicating a designated path, and may start compensation control at a time point earlier by Δt than the corrected time point ti. Thereby, even if an unexpected load is applied to the robot 30 that is in operation and a time lag occurs at the predetermined time point ti, the robot controller 40 can start compensation control at an appropriate timing.

Alternatively, the robot controller 40 may perform compensation control for reducing subject blurring while the imaging device 10 is positioned within a predetermined space including the imaging position using position information.

In the above description, the image processing device 20 outputs an imaging trigger to the imaging device 10. However, the PLC 50 in place of the image processing device 20 may output an imaging trigger. In addition, the image processing device 20 may be configured to perform processes of the PLC 50 and the robot controller 40. When the image processing device 20 is configured to perform a process of the PLC 50, it may be configured to further perform a process of the setting device 60.

<N. Actions and Effects>

As described above, in the appearance inspection system 1 of the present embodiment, the image processing device 20 or the PLC 50 causes the imaging device 10 to perform imaging when the imaging device 10 reaches the imaging position corresponding to the inspection target position. The robot controller 40 performs compensation control during a predetermined compensation operation period including a time point at which the imaging device 10 reaches the imaging position or while the imaging device 10 is positioned in a predetermined space including the imaging position. The compensation control is a control according to which at least one of the position and the orientation of the imaging device 10 is changed in a direction in which a relative movement between a field of view of the imaging device 10 and the inspection target position is canceled out.

According to the above configuration, when the imaging device reaches the imaging position, a relative movement between the imaging field of view and the inspection target position is canceled out. As a result, even if the workpiece W is imaged while changing a relative position of the imaging device 10 with respect to the workpiece W, it is possible to reduce subject blurring.

The robot controller 40 controls the robot 30 that moves the imaging device 10 and changes at least one of the position and the orientation of the imaging device 10 in a direction in which a relative movement between a field of view of the imaging device 10 and the inspection target position is canceled out. Thereby, it is possible to make the imaging device 10 easily perform an operation in a direction in which a relative movement between a field of view of the imaging device 10 and the inspection target position is canceled out.

The robot 30 moves the imaging device 10 along the designated path. The robot controller 40 changes the orientation of the imaging device 10 so that the imaging direction of the imaging device 10 approaches the inspection target position. Thereby, it is possible to cancel out a relative movement between a field of view of the imaging device 10 and the inspection target position while moving the imaging device 10, and it is possible to reduce subject blurring.

The appearance inspection system 1 may include, as a mechanism that moves the imaging device 10, the slide unit 35 that slidably supports the imaging device 10 and the robot 30 that moves the slide unit 35. In this case, the robot 30 moves the slide unit 35 along the designated path. The robot controller 40 controls the slide unit 35 such that the imaging device 10 is slid so that the imaging direction of the imaging device 10 approaches the inspection target position. Thereby, it is possible to cancel out a relative movement between a field of view of the imaging device 10 and the inspection target position while moving the slide unit 35, and it is possible to reduce subject blurring.

The appearance inspection system 1 may include the transport belt 91 or the rotary table 92 for moving the workpiece W so that the relative position is changed along the designated path as a movement mechanism for changing a relative position of the imaging device 10 with respect to the workpiece W. In this case, the robot 30 does not need to perform an operation for changing a relative position along the designated path. Therefore, a complex movement of the robot 30 can be prevented.

The robot controller 40 changes at least one of the position and the orientation of the imaging device 10 in a predetermined direction (for example, a sliding direction) during compensation control. The appearance inspection system 1 further includes the setting unit 63 that sets a designated path so that an angle formed by a movement direction of the relative position at the imaging position and the predetermined direction is less than 10 degrees. Thereby, the robot controller 40 changes at least one of the position and the orientation of the imaging device 10 in a predetermined direction, and thus can reliably cancel out a relative movement between the imaging field of view and the inspection target position according to a movement along the designated path.

The predetermined direction is, for example, perpendicular to the optical axis of the imaging device 10. Thereby, the setting unit 63 can set a designated path in which a range less than 10 degrees from a direction orthogonal to the imaging direction (a direction along the optical axis) of the imaging device 10 is set as a travelling direction. Generally, the surface of the workpiece W is perpendicular to the optical axis of the imaging device 10 in many cases. Therefore, it is easy to set a designated path along which a plurality of inspection target positions on the workpiece W are sequentially imaged.

<O. Appendix>

As described above, the present embodiment and the modified examples include the following disclosures.

(Configuration 1)

An appearance inspection system (1) configured to image an inspection target position on an object (W) using an imaging device (10) and allow appearance inspection to be performed while changing a relative position of the imaging device (10) with respect to the object (W) along a designated path, the appearance inspection system (1) including:

a movement mechanism (30, 35, 91, and 92) for changing the relative position;

a first control units (20 and 50) causing the imaging device (10) to perform imaging when the imaging device (10) reaches an imaging position corresponding to the inspection target position; and a second control unit (40) that changes at least one of a position and an orientation of the imaging device (10) in a direction in which a relative movement between a field of view of the imaging device (10) and the inspection target position according to the change in the relative position along the designated path is canceled out during a predetermined period including a time point at which the imaging device (10) reaches the imaging position or while the imaging device (10) is positioned in a predetermined space including the imaging position.

(Configuration 2)

The appearance inspection system (1) according to configuration 1, wherein the movement mechanism (30, 35, 91, and 92) include a first movement mechanism (30 and 35) that moves the imaging device (10), and wherein the second control unit (40) controls the first movement mechanisms (30 and 35) to change at least one of the position and the orientation of the imaging device (10) in a direction in which the relative movement is canceled out.

(Configuration 3)

The appearance inspection system (1) according to configuration 2, wherein the first movement mechanism (30 and 35) move the imaging device (10) along the designated path, and wherein the second control unit (40) changes the orientation of the imaging device (10) so that an imaging direction of the imaging device (10) approaches the inspection target position.

(Configuration 4)

The appearance inspection system (1) according to configuration 2, wherein the first movement mechanisms (30 and 35) include a slide unit (35) that slidably supports the imaging device (10) and a robot (30) that moves the slide unit (35), wherein the robot (30) moves the slide unit (35) along the designated path, and wherein the second control unit (40) controls the slide unit (35) to slide the imaging device (10) so that an imaging direction of the imaging device (10) approaches the inspection target position.

(Configuration 5)

The appearance inspection system (1) according to configuration 2, wherein the movement mechanisms (30, 35, 91, and 92) further include second movement mechanisms (91 and 92) that move the object (W) so that the relative position changes along the designated path.

(Configuration 6)

The appearance inspection system (1) according to any one of configurations 1 to 5, wherein the second control unit (40) changes at least one of the position and the orientation of the imaging device (10) in a predetermined direction, and wherein the appearance inspection system (1) further includes a setting unit (63) that sets the designated path so that an angle formed by a movement direction of the relative position at the imaging position and the predetermined direction is less than 10 degrees.

(Configuration 7)

The appearance inspection system (1) according to configuration 6, wherein the predetermined direction is perpendicular to an optical axis of the imaging device (10).

(Configuration 8)

A setting device (60) that is used in the appearance inspection system (1) according to configuration 6 or 7 and includes the setting unit (63).

(Configuration 9)

An inspection method of imaging an inspection target position on an object (W) using an imaging device (10) and allowing appearance inspection to be performed while changing a relative position of the imaging device (10) with respect to the object (W) along a designated path, the inspection method includes a step of starting imaging by the imaging device (10) when the imaging device (10) reaches an imaging position corresponding to the inspection target position; and a step of changing at least one of the position and the orientation of the imaging device (10) in a direction in which a relative movement between a field of view of the imaging device (10) and the inspection target position according to the change in the relative position along the designated path is canceled out during a predetermined period including a time point at which the imaging device (10) reaches the imaging position or while the imaging device (10) is positioned in a predetermined space including the imaging position.

Embodiments disclosed herein are only examples in all respects and should not be considered as restrictive. The scope of the disclosure is defined not by the above description but by the scope of the claims, and is intended to include meanings equivalent to the scope of the claims and all modifications within the scope. In addition, inventions described in the embodiment and modified examples are intended to be performed alone or in combination where possible.

What is claimed is:

1. An appearance inspection system configured to image an inspection target position on an object using an imaging device and allow appearance inspection to be performed while changing a relative position of the imaging device with respect to the object along a designated path, the appearance inspection system comprising:
   a movement mechanism changing the relative position;
   a first control unit causing the imaging device to perform imaging when the imaging device reaches a plurality of imaging positions corresponding to the inspection target position; and
   a second control unit that changes at least one of a position and an orientation of the imaging device in a direction to cancel out a relative movement between a field of view of the imaging device and the inspection target position as the relative position changes along the designated path during a predetermined period including a plurality of time points at which the imaging device reaches the plurality of imaging positions, so as to keep the object at a center of the field of view of the imaging device.

2. The appearance inspection system according to claim 1, wherein the movement mechanism comprises a first movement mechanism that moves the imaging device, and
   wherein the second control unit controls the first movement mechanism to change at least one of the position and the orientation of the imaging device in a direction in which the relative movement is canceled out.

3. The appearance inspection system according to claim 2, wherein the first movement mechanism moves the imaging device along the designated path, and
   wherein the second control unit changes the orientation of the imaging device to enable an imaging direction of the imaging device to approach the inspection target position.

4. The appearance inspection system according to claim 2, wherein the first movement mechanism comprises a slide unit that slidably supports the imaging device and a robot that moves the slide unit,
   wherein the robot moves the slide unit along the designated path, and
   wherein the second control unit controls the slide unit to slide the imaging device to enable an imaging direction of the imaging device to approach the inspection target position.

5. The appearance inspection system according to claim 2, wherein the movement mechanism further comprises a second movement mechanism that moves the object in a direction in which the relative position changes along the designated path.

6. The appearance inspection system according to claim 1, wherein the second control unit changes at least one of the position and the orientation of the imaging device in a predetermined direction, and
   wherein the appearance inspection system further comprises a setting unit that sets the designated path to enable an angle between a movement direction of the relative position at the imaging position and the predetermined direction to be less than 10 degrees.

7. The appearance inspection system according to claim 6, wherein the predetermined direction is perpendicular to an optical axis of the imaging device.

8. A setting device that is used in the appearance inspection system according to claim 6 and comprises the setting unit.

9. An inspection method of imaging an inspection target position on an object using an imaging device and allowing appearance inspection to be performed while changing a relative position of the imaging device with respect to the object along a designated path, the inspection method comprising steps of:
   starting imaging by the imaging device when the imaging device reaches a plurality of imaging positions corresponding to the inspection target position; and
   changing at least one of a position and an orientation of the imaging device in a direction to cancel out a relative movement between a field of view of the imaging device and the inspection target position as the relative position changes along the designated path during a predetermined period including a plurality of time points at which the imaging device reaches the plurality of imaging positions, so as to keep the object at a center of the field of view of the imaging device.

10. The appearance inspection system according to claim 2,
    wherein the second control unit changes at least one of the position and the orientation of the imaging device in a predetermined direction, and
    wherein the appearance inspection system further comprises a setting unit that sets the designated path to enable an angle between a movement direction of the relative position at the imaging position and the predetermined direction to be less than 10 degrees.

11. The appearance inspection system according to claim 3,
    wherein the second control unit changes at least one of the position and the orientation of the imaging device in a predetermined direction, and
    wherein the appearance inspection system further comprises a setting unit that sets the designated path to enable an angle between a movement direction of the relative position at the imaging position and the predetermined direction to be less than 10 degrees.

12. The appearance inspection system according to claim 4,
    wherein the second control unit changes at least one of the position and the orientation of the imaging device in a predetermined direction, and
    wherein the appearance inspection system further comprises a setting unit that sets the designated path to enable an angle between a movement direction of the relative position at the imaging position and the predetermined direction to be less than 10 degrees.

13. The appearance inspection system according to claim 5,
  wherein the second control unit changes at least one of the position and the orientation of the imaging device in a predetermined direction, and
  wherein the appearance inspection system further comprises a setting unit that sets the designated path to enable an angle between a movement direction of the relative position at the imaging position and the predetermined direction to be less than 10 degrees.

14. The appearance inspection system according to claim 10,
  wherein the predetermined direction is perpendicular to an optical axis of the imaging device.

15. The appearance inspection system according to claim 11,
  wherein the predetermined direction is perpendicular to an optical axis of the imaging device.

16. The appearance inspection system according to claim 12,
  wherein the predetermined direction is perpendicular to an optical axis of the imaging device.

17. The appearance inspection system according to claim 13,
  wherein the predetermined direction is perpendicular to an optical axis of the imaging device.

18. A setting device that is used in the appearance inspection system according to claim 7 and comprises the setting unit.

* * * * *